United States Patent
Mukunda et al.

(10) Patent No.: US 12,465,589 B2
(45) Date of Patent: Nov. 11, 2025

(54) METHOD AND COMPOSITION FOR TREATING CNS DISORDERS

(71) Applicant: IGC Pharma IP, LLC, Potomac, MD (US)

(72) Inventors: Ramachandra Mukunda, Potomac, MD (US); Jagadeesh S. Rao, Ashburn, VA (US); Amar R. Mukunda, Bethesda, MD (US)

(73) Assignee: IGC Pharma IP, LLC, Potomac, MD (US)

( * ) Notice: Subject to any disclaimer, the term of this patent is extended or adjusted under 35 U.S.C. 154(b) by 0 days.

(21) Appl. No.: 18/301,099

(22) Filed: Apr. 14, 2023

(65) Prior Publication Data

US 2023/0248697 A1    Aug. 10, 2023

Related U.S. Application Data

(62) Division of application No. 17/042,333, filed as application No. PCT/US2019/000014 on Mar. 29, 2019, now abandoned.

(60) Provisional application No. 62/650,942, filed on Mar. 30, 2018.

(51) Int. Cl.
| | |
|---|---|
| A61K 31/4045 | (2006.01) |
| A61K 9/107 | (2006.01) |
| A61K 31/00 | (2006.01) |
| A61K 31/12 | (2006.01) |
| A61K 31/7048 | (2006.01) |

(52) U.S. Cl.
CPC .......... *A61K 31/4045* (2013.01); *A61K 31/12* (2013.01); *A61K 31/658* (2023.05); *A61K 31/7048* (2013.01); *A61K 9/107* (2013.01)

(58) Field of Classification Search
None
See application file for complete search history.

(56) References Cited

U.S. PATENT DOCUMENTS

| | | | |
|---|---|---|---|
| 5,804,592 A | 9/1998 | Volicer | |
| 6,503,532 B1 | 1/2003 | Murty et al. | |
| 6,630,507 B1 | 10/2003 | Hampson et al. | |
| 6,730,330 B2 | 5/2004 | Whittle et al. | |
| 7,678,363 B2 | 3/2010 | Barlow et al. | |
| 7,906,643 B2 | 3/2011 | DiMauro | |
| 8,673,368 B2 | 3/2014 | Guy et al. | |
| 9,168,278 B2 | 10/2015 | Guy et al. | |
| 9,205,063 B2 | 12/2015 | Guy et al. | |
| 9,738,605 B2 | 8/2017 | Zhang | |
| 10,016,363 B2 | 7/2018 | Bromley | |
| 10,117,891 B2 | 11/2018 | Mukunda et al. | |
| 10,213,391 B2 | 2/2019 | Singh | |
| 10,258,580 B2 | 4/2019 | Iuvone et al. | |
| 10,413,578 B2 | 9/2019 | Bray et al. | |
| 10,596,159 B2 | 3/2020 | Mukunda et al. | |
| 10,660,872 B2 | 5/2020 | Sarne | |
| 10,729,665 B2 | 8/2020 | Whalley et al. | |
| 10,751,300 B2 | 8/2020 | Mukunda et al. | |
| 10,933,082 B2 | 3/2021 | Mukunda et al. | |
| 11,065,225 B1 | 7/2021 | Cao | |
| 11,351,152 B2 | 6/2022 | Mukunda et al. | |
| 11,446,276 B2 | 9/2022 | Cao | |
| 2005/0031651 A1 | 2/2005 | Gervais et al. | |
| 2005/0042172 A1 | 2/2005 | Whittle | |
| 2007/0049576 A1 | 3/2007 | Barlow et al. | |
| 2008/0033027 A1 | 2/2008 | Bascomb et al. | |
| 2008/0112895 A1 | 5/2008 | Kottayil et al. | |
| 2010/0292345 A1 | 11/2010 | Pertwee | |
| 2011/0229555 A1 | 9/2011 | Helson et al. | |
| 2011/0257256 A1 | 10/2011 | Fuchs et al. | |
| 2013/0059018 A1 | 3/2013 | Parolaro et al. | |
| 2013/0281523 A1 | 10/2013 | Letendre et al. | |
| 2014/0170211 A1* | 6/2014 | Bennett | A61K 31/12 424/752 |
| 2016/0081927 A1 | 3/2016 | Bromley | |
| 2016/0129060 A1 | 5/2016 | Bray et al. | |
| 2016/0289187 A1 | 10/2016 | Zhang | |
| 2017/0027978 A1 | 2/2017 | Mukunda et al. | |
| 2017/0042835 A1 | 2/2017 | Singh | |
| 2017/0333387 A1 | 11/2017 | Sarne | |

(Continued)

FOREIGN PATENT DOCUMENTS

| | | |
|---|---|---|
| EP | 2640379 | 9/2013 |
| GB | 2434312 A | 7/2007 |

(Continued)

OTHER PUBLICATIONS

Drugs.com. "Drugs used to treat Alzheimer's Disease." Retrieved from the Internet on Nov. 16, 2023, https://www.drugs.com/condition/alzheimer-s-disease.html (Year: 2023).*
Drugs.com. Polysorbated. Publised Jul. 17, 2017. Retrieved from the Wayback Machine on Feb. 22, 2024, https://web.archive.org/web/20170717070355/https://www.drugs.com/inactive/polysorbate-176.html (Year: 2017).*
Fishbein et al. Long-term behavioral and biochemical effects of an ultra-low dose of THC: neuroprotection and ERK signaling. Exp. Brain Research (2012) 221:437-448. (Year: 2012).*
Steinmann J, Buer J, Pietschmann T, Steinmann E. Anti-infective properties of epigallocatechin-3-gallate (EGCG), a component of green tea. Br J Pharmacol. Mar. 2013;168(5):1059-73. doi: 10.1111/bph. 12009. (Year: 2013).*
Guo et al. European Journal of Pharmaceutical Sciences. The applications of Vitamin E TPGS in drug delivery. Published 2013. (Year: 2013).*

(Continued)

Primary Examiner — James H Alstrum-Acevedo
Assistant Examiner — Lauren Wells
(74) Attorney, Agent, or Firm — Studebaker Brackett PLLC

(57) ABSTRACT

Compositions and methods for treating a range of Central Nervous System (CNS) disorders and diseases such as amyloidosis, protein folding diseases, tauopathy, and specifically Alzheimer's Disease and Parkinson's Disease, among others, in humans and in veterinary animals, by administering to a subject in need thereof a formulation comprising of melatonin, curcumin, and *cannabis*, specifically THC alone or with CBD.

13 Claims, No Drawings

(56) References Cited

U.S. PATENT DOCUMENTS

| | | |
|---|---|---|
| 2018/0071210 A1 | 3/2018 | Wilkhu et al. |
| 2018/0111891 A1 | 4/2018 | Tsai et al. |
| 2018/0133272 A1 | 5/2018 | Crowley |
| 2018/0161285 A1 | 6/2018 | Mukunda et al. |
| 2018/0228788 A1 | 8/2018 | Mukunda et al. |
| 2019/0030062 A1 | 1/2019 | Mukunda et al. |
| 2019/0201372 A1 | 7/2019 | Mckay |
| 2020/0037638 A1 | 2/2020 | Faraci et al. |
| 2020/0046722 A1 | 2/2020 | Mukunda |
| 2020/0179342 A1 | 6/2020 | Mukunda et al. |
| 2020/0246404 A1 | 8/2020 | Yucel et al. |
| 2020/0383935 A1 | 12/2020 | Mukunda et al. |
| 2021/0023053 A1 | 1/2021 | Mukunda et al. |
| 2021/0059976 A1 | 3/2021 | Wilkhu et al. |
| 2021/0077455 A1 | 3/2021 | Whalley et al. |
| 2021/0236417 A1 | 8/2021 | Plakogiannis et al. |
| 2021/0353705 A1 | 11/2021 | Mukunda et al. |
| 2022/0241244 A1 | 8/2022 | Mukunda et al. |
| 2022/0257560 A1 | 8/2022 | Mukunda et al. |
| 2022/0265598 A1 | 8/2022 | Cao |
| 2022/0265599 A1 | 8/2022 | Cao |
| 2022/0280613 A1 | 9/2022 | Cao |
| 2022/0370531 A1 | 11/2022 | Obias et al. |
| 2023/0248697 A1 | 8/2023 | Mukunda et al. |
| 2023/0248746 A1* | 8/2023 | Raz .................. A61K 31/352 514/456 |
| 2024/0009207 A1 | 1/2024 | Mukunda et al. |

FOREIGN PATENT DOCUMENTS

| | | | |
|---|---|---|---|
| WO | 98/50027 | A1 | 11/1998 |
| WO | 02/064109 | A2 | 8/2002 |
| WO | 2005/077394 | A1 | 8/2005 |
| WO | 2007/083098 | A1 | 7/2007 |
| WO | 2010/012506 | A1 | 2/2010 |
| WO | 2010/045577 | A2 | 4/2010 |
| WO | 2012/068516 | A2 | 5/2012 |
| WO | 2016/044370 | A1 | 3/2016 |
| WO | 2016/071819 | A1 | 5/2016 |
| WO | 2016/118391 | A1 | 7/2016 |
| WO | 2016/160542 | A1 | 10/2016 |
| WO | 2017/027651 | A1 | 2/2017 |
| WO | 2017/218629 | A1 | 12/2017 |
| WO | 2018/002665 | A1 | 1/2018 |
| WO | 2018/152334 | A1 | 8/2018 |
| WO | 2018/160510 | A1 | 9/2018 |
| WO | 2019/036243 | A1 | 2/2019 |
| WO | 2019/135077 | A1 | 7/2019 |
| WO | 2019/190608 | A1 | 10/2019 |
| WO | 2020/072997 | A1 | 4/2020 |
| WO | 2020/237247 | A1 | 11/2020 |
| WO | 2021/011421 | A1 | 1/2021 |
| WO | 2022/016160 | A1 | 1/2022 |
| WO | 2023/044433 | | 3/2023 |

OTHER PUBLICATIONS

Buckley et al. Bedside Method to Estimate Actual Body Weight in the Emergency Department. The Journal of Emergency Medicine. Published 2011. (Year: 2011).*

Cao, Chuanhai et al. 'The Potential Therapeutic Effects of THC on Alzheimer's Disease'. Jan. 1, 2014 : 973 984. (Year: 2014).*

MayoClinic. Cruetzfeldt-Jakob disease. Retrieved from the Internet on Mar. 31, 2025, https://www.mayoclinic.org/diseases-conditions/parkinsons-disease/symptoms-causes/syc-20376055. (Year: 2025).*

Sagredo, O., Pazos, M.R., Satta, V., Ramos, J.A., Pertwee, R.G. and Fernández-Ruiz, J. (2011), Neuroprotective effects of phytocannabinoid-based medicines in experimental models of Huntington's disease. J. Neurosci. Res., 89: 1509-1518. (Year: 2011).*

Abate et al. "Potential and limits of cannabinoids in Alzheimer's disease therapy" Biology; Jun. 2021; 10(6): 542, doi: 10.3390/biology10060542, 21 pages.

Abbvie Inc. "Marinol (dronabinol) capsules prescribing information" Reference ID: 4145204; Aug. 2017; www.accessdata.fda.gov/drugsatfda_docs/label/2017/018651s029lbl.pdf, 20 pages.

Aggarwal et al. "Curcumin differs from tetrahydrocurcumin for molecular targets, signaling pathways and cellular responses" Molecules; Dec. 2014; 20(1): 185-205.

Ahmed et al. "Safety, pharmacodynamics, and pharmacokinetics of multiple oral doses of delta-9-tetrahydrocanna-binol in older persons with dementia" Psychopharmacology (Berl); Jul. 2015 ePub Mar. 2015; 232(14): 2587-2595.

Ahmed Clinical Pharmacology of Oral Tetrahydrocannabinol in Older People with Dementia; Radboud University Nijmegen, Nijmegen, NL; Sep. 2016; 316 pages.

Akirav "The role of cannabinoids in modulating emotional and nonemotional memory processes in the hippocampus" Front Behav Neurosci; Jun. 2011; 5: 34, doi: 10.3389/fnbeh.2011.00034, 11 pages.

Alsherbiny & Li "Medicinal cannabis—Potential drug interactions" Medicines; Dec. 2018; 6(1): 3, doi: 10.3390/medicines6010003, 12 pages.

Amanullah et al. "Synthetic cannabinoids in dementia with agitation: Case studies and literature review" Clin Neuropsychiatry; Jun.-Aug. 2013 ePub Jan. 2013; 10(3-4): 142-147.

Amin & Ali "Pharmacology of medical cannabis" Adv Exp Med Biol; Jul. 2019; 1162: 151-165.

Andersen et al. "Pharmacokinetics of oral and intravenous melatonin in healthy volunteers" BMC Pharmacol Toxicol; Feb. 2016; 17: 8, doi: 10.1186/s40360-016-0052-2, five pages.

Arendash & Cao "Caffeine and coffee as therapeutics against Alzheimer's disease" J Alzheimer Dis; Apr. 2010; 20(S1): S117-S126.

Aso & Ferrer "Cannabinoids for treatment of Alzheimer's disease: Moving toward the clinic" Front Pharmacol; Mar. 2014; 5: 37, doi: 10.3389/fphar.2014.00037, 11 pages.

Aso et al. "Cannabis-based medicine reduces multiple pathological processes in AβPP/PS1 mice" J Alzheimers Dis; Jan. 2015; 43(3): 977-991.

Aso et al. "Cannabinoid receptor 2 participates in amyloid-β processing in a mouse model of Alzheimer's disease but plays a minor role in the therapeutic properties of a cannabis-based medicine" J Alzheimers Dis; Feb. 2016; 51(2): 489-500.

Aso et al. "Delineating the efficacy of a cannabis-based medicine at advanced stages of dementia in a murine model" J Alzheimers Dis; Oct. 2016; 54(3): 903-912.

Bahij et al. "Cannabinoids for the neuropsychiatric symptoms of dementia: A systematic review and meta-analysis" Can J Psychiatry; Jun. 2020 ePub Dec. 2019; 65(6): 365-376.

Bahij et al. "Cannabinoids in the management of behavioral, psychological, and motor symptoms of neurocognitive disorders: A mixed studies systematic review" J Cannabis Res; Mar. 2022; 4(1): 11, doi: 10.1186/s42238-022-00119-y, 19 pages.

Baratta et al. "Cannabis for medical use: Analysis of recent clinical trials in view of current legislation" Front Pharmacol; May 20222; 13: 888903, doi: 10.3389/fphar.2022.888903, 17 pages.

Benito et al. "Cannabinoid CB2 receptors and fatty acid amide hydrolase are selectively overexpressed in neuritic plaque-associated glia in Alzheimer's disease brains" J Neurosci; Dec. 2003; 23(35): 11136-11141.

Bhatti et al. "Lifestyle modifications and nutritional interventions in aging-associated cognitive decline and Alzheimer's disease" Front Aging Neurosci; Jan. 2020; 11: 369, doi: 10.3389/fnagi.2019.00369, 15 pages.

Bilbao & Spanagel "Medical cannabinoids: A pharmacology-based systematic review and meta-analysis for all relevant medical indications" BMC Med; Aug. 2022; 20(1): 259, doi: 10.1186/s12916-022-02459-1, 29 pages.

Bilkei-Gorzo et al. "A chronic low dose of Δ9-tetrahydrocannabinol (THC) restores cognitive function in old mice" Nature Med; Jun. 2017; 23(6): 782-787.

Bisogno & Di Marzo "Cannabinoid receptors and endocannabinoids: Role in neuroinflammatory and neurodegenerative disorders" CNS Neurol Disord Drug Targets; Nov. 2010; 9(5): 564-573.

(56) References Cited

OTHER PUBLICATIONS

Black et al. "Cannabinoids for the treatment of mental disorders and symptoms of mental disorders: A systematic review and meta-analysis" Lancet Psychiatry; Dec. 2019 Epub ; 6(12): 995-1010.
Boggs et al. "Clinical and preclinical evidence for functional interactions of cannabidiol and Δ9-tetrahydrocannabinol" Neuropsychopharmacol; Jan. 2018 ePub Oct. 2017; 43(1): 142-154.
Bosnjak Kuharic et al. "Cannabinoids for the treatment of dementia" Cochrane Database Syst Rev; Sep. 2021; 9(9): CD012820, doi: 10.1002/14651858.CD012820_pub2, 77 pages.
Botsford et al. "Cannabis and cannabinoids in mood and anxiety disorders: Impact on illness onset and course, and assessment of therapeutic potential" Am J Addict; Jan. 2020; 29(1): 9-26.
Breijyeh et al. "Cannabis: A toxin-producing plant with potential therapeutic uses" Toxin; Feb. 2021; 13: 117, doi: 10.3390/toxins13020117, 29 pages.
Briggs et al. "Drug treatments in Alzheimer's disease" Clin Med; Jun. 2016; 16(3): 247-253.
Broers et al. "Prescription of a THC/CBD-based medication to patients with dementia: A pilot study in Geneva" Med Cannabis Cannabinoids; Apr. 2019; 2(1): 56-59.
Brown & Winterstein "Potential adverse drug events and drug-drug interactions with medical and consumer cannabidiol (CBD) use" J Clin Med; Jul. 2019; 8(7): 989; doi:10.3390/jcm8070989, 14 pages.
Bui & Nguyen "Natural product for the treatment of Alzheimer's disease" J Basic Clin Physiol Pharmacol; Jul. 2017; 28(5): 413-423.
Calabrese et al. "Biphasic effects of THC in memory and cognition" Eur J Clin Invest; May 2018; 48(5): e12920, nine pages.
Campbell & Gowran "Alzheimer's disease; taking the edge off with cannabinoids?" Br J Pharmacol; Nov. 2007; 152(5): 655-662.
Cao et al. "Caffeine suppresses β-amyloid levels in plasma and brain of Alzheimer's transgenic mice" J Alzheimer Dis; Sep. 2009; 17(3): 681-697.
Cao et al. "The potential therapeutic effects of THC on Alzheimer's disease" J Alzheimer Dis; Sep. 2014; 42(3): 973-984.
Cardinali et al. "Melatonin therapy in patients with Alzheimer's disease" Antioxidant; Jun. 2014; 3(2): 245-277.
Cardinali "Melatonin: Clinical perspectives in neurodegeneration" Front Endocrinol; Jul. 2019; 10: 480, doi: 10.3389/fendo.2019.00480, 22 pages.
Casarejos et al. "Natural cannabinoids improve dopamine neurotransmission and tau and amyloid pathology in a mouse model of tauopathy" J Alzheimers Dis; May 2013; 35(3): 525-539.
Cenini & Voos "Mitochondria as potential targets in Alzheimer disease therapy: An update" Front Pharmacol; Aug. 2019; 10: 902, doi: 10.3389/fphar.2019.00902, 20 pages.
Chainoglou & Hadjipavlou-Litina "Curcumin in health and diseases: Alzheimer's disease and curcumin analogues, derivatives, and hybrids" Int J Mol Sci; Mar. 2020; 21(6): 1975, doi:10.3390/ijms21061975, 55 pages.
Chen et al."Pharmacological properties of rutin and its potential uses for Alzheimer's disease" Exp Stroke Translat Med; Feb. 2021; 13(2): 1-12.
Chitimus et al. "Melatonin's impact on antioxidative and anti-inflammatory reprogramming in homeostasis and disease" Biomolecules; Aug. 2020; 10(9): 1211, doi: 10.3390/biom10091211, 28 pages.
Cohen-Mansfield et al. "Melatonin for treatment of sundowning in elderly persons with dementia—A preliminary study" Arch Gerontol Geriatr, Aug. 2000; 31(1): 65-76.
Cooray et al. "Current aspects of the endocannabinoid system and targeted THC and CBD phytocannabinoids as potential therapeutics for Parkinson's and Alzheimer's diseases" Mol Neurobiol; Nov. 2020 ePub Aug. 2020; 57(11): 4878-4890.
Crippa et al. "Translational investigation of the therapeutic potential of cannabidiol (CBD): Toward a new age" Front Immunol; Sep. 2018; 9: 2009, doi: 10.3389/fimmu.2018.02009, 16 pages.
Croxford "Therapeutic potential of cannabinoids in CNS disease" CNS Drugs; Mar. 2003; 17(3): 179-202.
Cummings "New approaches to symptomatic treatments for Alzheimer's disease" Mol Neurodegener; Jan. 2021; 16(1): 2, doi: 10.1186/s13024-021-00424-9, 13 pages.
Cummings et al. "Alzheimer's disease drug development pipeline: 2021" Alzheimers Dement; May 2021; 7(1): e12179, doi: 10.1002/trc2.12179, 24 pages.
Ahmed et al. "Safety and pharmacokinetics of oral delta-9-tetrahydrocannabinol in healthy subjects: A randomized controlled trial" Eur Neuropsychopharmacol; Sep. 2014 ePub Jun. 2014; 24(9): 1475-1482.
Van den Elsen et al. "Tetrahydrocannabinol in behavioral disturbances in dementia: A crossover randomized controlled trial" Am J Geriatr Psychiatry; Dec. 2015 ePub Jul. 2015; 23(12): 1214-1224.
Van den Elsen Tetrahydrocannabinol in the Treatment of Neuropsychiatric Symptoms in Dementia; Ph.D. Thesis presented to Radboud University Nijmegen, Nijmegen, NL; Mar. 2016; 217 pages.
Pauli et al. "Cannabidiol drugs clinical trial outcomes and adverse effects" Front Pharmacol; Feb. 2020; 11: 63, doi: 10.3389/fphar.2020.00063, six pages.
Paunescu et al. "A systematic review of clinical studies on the effect of psychoactive cannabinoids in psychiatric conditions in Alzheimer dementia" Am J Ther; May 2020; 27(3): e249-e269.
Dos Santos et al. "Neuropharmacological effects of the main phytocannabinoids: A narrative review" Adv Exp Med Biol; Dec. 2020; 1264: 29-45.
Canadian Intellectual Property Office "Office Action" for corresponding Canadian Application No. 3,095,729.
Babayeva et al. "Marijuana compounds: A nonconventional approach to Parkinson's disease therapy" Parkinsons Dis; Dec. 2016; 2016: 1279042, doi: 10.1155/2016/1279042; 19 pages.
Stoner "Effects of marijuana on mental health: Anxiety disorders" Alcohol & Drug Abuse Institute, University of Washington, Seattle, WA; Jun. 2017; http://adai.uw.edu/pubs/pdf/2017mjanxiety.pdf; six pages.
IGC Pharma "Study of IGC-AD1 in subjects with dementia due to Alzheimer's disease" ClinicalTrials.gov ID NCT04749563, National Library of Medicine, Bethesda, MD; downloaded from clinicaltrials.gov/study/NCT04749563 on Jun. 26, 2023, first posted Feb. 2021, last update posted Sep. 2022; 11 pages.
IGC Pharma "IGC-AD1 trial on agitation in dementia due to Alzheimer's (IGC-AD1-P2)" ClinicalTrials.gov ID NCT05543681, National Library of Medicine, Bethesda, MD; downloaded from clinicaltrials.gov/study/NCT04749563 on Jun. 26, 2023, first posted Feb. 2021, last update posted Sep. 2022; 11 pages.
India Globalization Capital "IGC announces IRB approval of its IGC-AD1 for a phase-2 study" IGC press release, Bethesda, MD; Sep. 19, 2019; one page.
India Globalization Capital "FDA approves initiation of IGC's cannabinoid trial on Alzheimer's patients" IGC press release, Potomac, MD; Aug. 11, 2020; one page.
India Globalization Capital "IGC commences phase 1 of cannabinoid clinical trial for Alzheimer's patients" IGC press release, Potomac, MD; Nov. 23, 2020; two pages.
India Globalization Capital "Update on IGC's phase 1 clinical trial on Alzheimer's patients" IGC press release, Potomac, MD; Feb. 22, 2021; two pages.
India Globalization Capital "India Globalization Capital (IGC) completes cohort 1 of its phase 1 THC-based clinical trial on Alzheimer's patients" IGC press release, Potomac, MD; May 14, 2021; two pages.
India Globalization Capital "IGC completes cohort 2 of its phase 1 THC-based clinical trial on Alzheimer's patients" IGC press release, Potomac, MD; Jun. 7, 2021; two pages.
India Globalization Capital "IGC completes the final cohort of its phase 1 clinical trial on Alzheimer's patients" IGC press release, Potomac, MD; Jun. 23, 2021; one page.
India Globalization Capital "IGC completes its phase 1 clinical trial on Alzheimer's patients, Reports safety and tolerability" IGC press release, Potomac, MD; Sep. 7, 2021; one page.

(56) References Cited

OTHER PUBLICATIONS

India Globalization Capital "Phase 1 clinical trial data indicate IGC's THC-based investigational new drug may reduce symptoms of dementia in Alzheimer's patients" IGC press release, Potomac, MD; Dec. 2, 2021; two pages.

India Globalization Capital "IGC commences phase 2 clinical trials evaluating drug candidate IGC-AD1 for the treatment of agitation in dementia from Alzheimer's disease" IGC press release, Potomac, MD; Dec. 1, 2022; two pages.

India Globalization Capital "IGC receives no objection letter from Health Canada" IGC press release, Potomac, MD; Jan. 4, 2023; three pages.

IGC Pharma "IGC Pharma, Inc. presenting 6 posters on the positive impact of IGC-AD1 on neuropsychiatric symptoms in dementia at the 2023 Alzheimer's Association International Conference" IGC Pharma press release, Potomac, MD; Jul. 18, 2023; three pages.

IGC Pharma "IGC Pharma expands phase 2 trial of IGC-AD1 to include the University of Puerto Rico" IGC Pharma press release, Potomac, MD; Aug. 2, 2023; two pages.

Ashmore "IGC Pharma advances In Alzheimer's research from pre-clinical studies to phase two trial with its novel therapy candidate IGC-AD1" Benzinga; Mar. 2024; https://www.benzinga.com/partner/biotech/24/03/37819235/igc-pharma-advances-in-alzheimers-research-from-pre-clinical-studies-to-phase-two-trials-with-its, two pages.

Cohen et al. "Study rationale and baseline data for pilot trial of dronabinol adjunctive treatment of agitation in Alzheimer's dementia (THC-AD)" International Psychogeriatrics; Oct. 2021; doi: 10.1017/S1041610221001150, abstract only.

drugs.com "Medications for Alzheimer's disease" Drugsite Limited, Dallas, TX(?); downloaded Mar. 15, 2025; https://www.drugs.com/condition/alzheimer-s-disease.html, three pages.

drugs.com "Medications for agitation associated with dementia due to Alzheimer's disease" Drugsite Limited, Dallas, TX(?); downloaded Mar. 15, 2025; https://www.drugs.com/condition/agitation-associated-with-dementia-due-to-alzheimer-s-disease.html, two pages.

Higginbotham "Revolutionary Alzheimer's drug by IGC shows early success" Benzinga; Mar. 2024; hhttps://www.benzinga.com/general/health-care/24/03/37854695/exclusive-revolutionary-alzheimers-drug-by-igc-shows-early-success, two pages.

Di Marzo "New approaches and challenges to targeting the endocannabinoid system" Nature Reviews Drug Discovery; Sep. 2018 ePub Aug. 2018; 17(9): 623-639.

De Mauleon et al. "Agitation in Alzheimer's disease: Novel outcome measures reflecting the International Psychogeriatric Association (IPA) agitation criteria" Alzheimer's & Dementia; Oct. 2021 ePub Jan. 2021; 17(10): 1687-1697.

Mehta "Protein folding: A new twist on brain disease" BrainFacts/SfN, Washington, DC(?); May 2010; www.brainfacts.org/archives/2010/protein-folding-a-new-twist-on-brain-disease, three pages.

Rosenberg et al. "Trial of dronabinol adjunctive treatment of agitation in Alzheimer's disease (AD) (THC-AD)" American Journal of Geriatric Psychiatry; Apr. 2020; 28(4) Suppl: S121-S122, Poster NR-2.

Rosenberg et al. "Pilot trial of dronabinol adjunctive treatment of agitation in Alzheimer's disease (THC-AD)" Alzheimer's & Dementia; Jun. 2023; 19(Suppl 4): e064983, doi: 10.1002/alz.064983, three pages.

Ruthirakuhan et al. "Natural and synthetic cannabinoids for agitation and aggression in Alzheimer's disease: A meta-analysis" Journal of Clinical Psychiatry; Jan. 2019; 80(2): 18r12617, abstract only.

Karasek et al. "Future of melatonin as a therapeutic agent" Neuro Endocrinol Lett; Apr. 2002; 23(suppl 1): 181-121.

Karl et al. "The therapeutic potential of the endocannabinoid system for Alzheimer's disease" Expert Opin Ther Targets; Apr. 2012; 16(4):407-420.

Kim et al. "A review on studies of marijuana for Alzheimer's disease—Focusing on CBD, THC" J Pharmacopuncture; Dec. 2019; 22(4): 225-230.

Kocis & Vrana "Delta-9-tetrahydrocannabinol and cannabidiol drug-drug interactions" Med Cannabis Cannabinoids; Aug. 2020 ePub Jul. 2020; 3(1): 61-73.

Kogan & Mechoulam "Cannabinoids in health and disease" Dialogues Clin Neurosci; Dec. 2007; 9(4): 413-430.

Kopustinskiene et al. "Molecular mechanisms of melatonin-mediated cell protection and signaling in health and disease" Pharmaceutics; Jan. 2021; 13(2): 129, doi: 10.3390/pharmaceutics13020129, 19 pages.

Kopustinskiene et al. "Cannabis sativa L. bioactive compounds and their protective role in oxidative stress and inflammation" Antioxidants (Basel); Apr. 2022; 11(4): 660, doi: 10.3390/antiox11040660, 12 pages.

Lacroix et al. "What do we know about medical cannabis in neurological disorders and what are the next steps?" Front Pharmacol; Apr. 2022; 13: 883987, doi: 10.3389/fphar.2022.883987, ten pages.

Lanctôt et al. "Neuropsychiatric signs and symptoms of Alzheimer's disease: New treatment paradigms" Alzheimers Dement; Aug. 2017; 3(3): 440-449.

Laux et al. "Long-term safety and efficacy of cannabidiol in children and adults with treatment resistant Lennox-Gastaut syndrome or Dravet syndrome: Expanded access program results" Epilepsy Res; Aug. 2019 ePub Mar. 2019; 154: 13-20.

Legare et al. "Therapeutic potential of cannabis, cannabidiol, and cannabinoid-based pharmaceuticals" Pharmacology; Mar. 2022 ePub Jan. 2022; 107(3-4): 131-149.

Lim et al. "A systematic review of the effectiveness of medical cannabis for psychiatric, movement and neurodegenerative disorders" Clin Psychopharmcol Neurosci; Nov. 2017; 15(4): 301-312.

Lin et al. "Melatonin in Alzheimer's disease" Int J Mol Sci; Jul. 2013; 14(7): 14575-14593.

Lin et al. "Trough melatonin levels differ between early and late phases of Alzheimer disease" Clin Psychopharmcol Neurosci; Feb. 2021; 19(1): 135-144.

Liu et al. "Cannabinoids for the treatment of agitation and aggression in Alzheimer's disease" CNS Drugs; Aug. 2015; 29(8): 615-623.

Liu et al. "Pharmacological treatment trials of agitation in Alzheimer's disease: A systematic review of ClinicalTrials.gov registered trials" Alzheimers Dement; Mar. 2021; 7(1): e12157, doi: 10.1002/trc2.12157, 18 pages.

Lowe et al. "Cannabis and mental illness: A review" Eur Arch Psychiatry Clin Neurosci; Feb. 2019; 269(1): 107-120.

Lucas et al. "The pharmacokinetics and the pharmacodynamics of cannabinoids" Br J Clin Pharmcol; Nov. 2018 ePub Aug. 2018; 84(11): 2477-2482.

Maiti & Dunbar "Use of curcumin, a natural polyphenol for targeting molecular pathways in treating age-related neurodegenerative diseases" Int J Mol Sci; May 2018; 19(6): 1637, doi: 10.3390/ijms19061637, 42 pages.

Mannucci et al. "Neurological aspects of medical use of cannabidiol" CNS Neurol Disord Drug Targets; Aug. 2017; 16(5): 541-553.

Marchalant et al. "Cannabinoids attenuate the effects of aging upon neuroinflammation and neurogenesis" Neurobiol Dis; May 2009; 34(2): 300-307.

Markovic et al. "Cannabinoids for the treatment of dementia" Cochrane Database Syst Rev; Oct. 2017; 2017(10): CD012820, doi: 10.1002/14651858.CD012820, 14 pages.

Maroon & Bost "Review of the neurological benefits of phytocannabinoid" Surg Neurol Int; Apr. 2018; 9: 91, doi: 10.4103/sni.sni_45_18, 13 pages.

Matsubara et al. "Melatonin increases survival and inhibits oxidative and amyloid pathology in a transgenic model of Alzheimer's disease" J Neurochem; Jun. 2003; 85(5): 1101-1108.

Maurizi et al. "The mystery of Alzheimer's disease and its prevention by melatonin" Med Hypotheses; Oct. 1995, 45(4): 339-340.

McCleery et al. "Pharmacotherapies for sleep disturbances in dementia" Cochrane Database Syst Rev; Nov. 2016; 11(11): CD009178, doi: 10.1002/14651858.CD009178.pub3, 55 pages.

McCormick et al. The Health Effects of Cannabis and Cannabinoids; Washington DC: The National Academies Press; Jan. 2017; doi: 10.17226/24625, xviii + 468 pages.

(56) References Cited

OTHER PUBLICATIONS

Mehta "Protein folding: A new twist on brain disease" BrainFacts/SfN; May 2010; www.brainfacts.org/archives/2010/protein-folding-a-new-twist-on-brain-disease.

Milano et al. "Cannabinoids involvement in neurodegenerative diseases" Curr Neurobiol; Oct. 2017; 8(3): 135-144.

Milano & Capasso "Neuroprotection by cannabinoids in neurodegenerative diseases" Alzheimers Dement Cogn Neurol; Jan. 2018; 2(1): 1-7, doi: 10.15761/ADCN.1000120, seven pages.

Millar et al. "A systematic review on the pharmacokinetics of cannabidiol in humans" Front Pharmcol; Nov. 2018; 9: 1365, doi: org/10.3389/fphar.2018.01365, 13 pages.

Millar et al. "A systematic review of cannabidiol dosing in clinical populations" Br J Clin Pharmcol; Sep. 2019 ePub Jul. 2019; 85(9): 1888-1900.

Mohorko et al. "Curcumin labeling of neuronal fibrillar tau inclusions in human brain samples" J Neuropathol Exp Neurol; Apr. 2010; 69(4): 405-414.

Monmouth Medical Center "Synthetic marijuana reduces agitation in patients with Alzheimer's" Science Daily; Nov. 2003, www.eurekalert.org/news-releases/480207, two pages.

Monteiro et al. "Cannabinoid pharmacology and its therapeutic uses in Alzheimer's disease" Neural Regener Res; May 2021; 16(5): 990-991.

Mouli et al. "Balancing the neuroprotective versus neurotoxic effects of cannabis" in Medicinal Herbs and Fungi (Agrawal & Dhanasekaran, eds.); Jan. 2021; 203-226, doi: 10.1007/978-981-33-4141-8_8, 24 pages.

Mutsuga et al. "Binding of curcumin to senile plaques and cerebral amyloid angiopathy in the aged brain of various animals and to neurofibrillary tangles in Alzheimer's brain" J Vet Med Sci; May 2018; 74(1): 51-57.

Nidadavolu et al. "Efficacy of $\Delta 9$-tetrahydrocannabinol (THC) alone or in combination with a 1:1 ratio of cannabidiol (CBD) in reversing the spatial learning deficits in old mice" Front Aging Neurosci; Aug. 2021; 13: 718850, doi: 10.3389/fnagi.2021.718850, 11 pages.

Nitzan et al. "An ultra-low dose of $\Delta 9$-tetrahydrocannabinol alleviates Alzheimer's disease-related cognitive impairments and modulates TrkB receptor expression in a 5XFAD mouse model" Int J Mol Sci; Aug. 2022; 23(16): 9449, doi: 10.3390/ijms23169449, 13 pages.

Noel "Evidence for the use of 'medical marijuana' in psychiatric and neurologic disorders" Ment Health Clin; Mar. 2018 ePub Jan. 2017; 7(1): 29-38.

Oberbarnscheidt & Miller "The impact of cannabidiol on psychiatric and medical conditions" J Clin Med Res; Jun. 2020; 12(7): 393-403.

Olcese et al. "Protection against cognitive deficits and markers of neurodegeneration by long term oral administration of melatonin in a transgenic model of Alzheimer disease" J Pineal Res; Aug. 2009 ePub Jun. 2009; 47(1): 82-96.

O'Neal-Moffitt et al. "Prophylactic melatonin significantly reduces Alzheimer's neuropathology and associated cognitive deficits independent of antioxidant pathways in A$\beta$PPswe/PS1 mice" Mol Neurodegener; Jul. 2015; 10: 27, doi: 10.1186/s13024-015-0027-6, 21 pages.

Ortiz et al. "Medicinal cannabis and central nervous system disorders" Front Pharmacol; Apr. 2022; 13: 881810, doi: 10.3389/fphar.2022.881810, 24 pages.

Outen et al. "Cannabinoids for agitation in Alzheimer's disease" Am J Geriatr Psychiary; Dec. 2021 ePub Jan. 2021; 29(12): 1253-1263, doi: 10.1016/j.jagp.2021.01.015, 11 pages.

Paes-Colli et al. "Phytocannabinoids and cannabis-based products as alternative pharmacotherapy in neurodegenerative diseases: From hypothesis to clinical practice" Front Cell Neurosci; May 2022; 16: 917164; doi: 10.3389/fncel.2022.917164, 18 pages.

Passmore "The cannabinoid receptor agonist nabilone for the treatment of dementia-related agitation" Int J Geriatr Psychiatry; Jan. 2008; 23(1): 116-117.

Peprah & McCormack "Medical cannabis for the treatment of dementia: A review of clinical effectiveness and guidelines" Ottawa: The Canadian Agency for Drugs and Technologies in Health; Jul. 2019; 24 pages.

Perry & Howes "Medicinal plants and dementia rherapy: Herbal hopes for brain aging?" CNS Neurosci Ther; Oct. 2010; 17(6): 683-698.

Pertwee "The diverse CB1 and CB2 receptor pharmacology of three plant cannabinoids: $\Delta\Delta 9$-tetrahydrocanna-binol, cannabidiol and $\Delta 9$-tetrahydrocannabivarin" Br J Pharmacol; Jan. 2008 ePub Sep. 2007;153(2): 199-215.

Pocuca et al. "The effects of cannabis use on cognitive function in healthy aging: A systematic scoping review" Arch Clin Neuropsychol; Aug. 2021 ePub Nov. 2020; 36(5): 673-685.

Ramírez et al. "Prevention of Alzheimer's disease pathology by cannabinoids: Neuroprotection mediated by blockade of microglial activation" J Neurosci; Feb. 2005; 25(8): 1904-1913.

Reddy et al. "Abnormal mitochondrial dynamics and synaptic degeneration as early events in Alzheimer's disease: Implications to mitochondria-targeted antioxidant therapeutics" Biochim Biophys Acta; May 2012; 1822(5): 639-649.

Reddy et al. "Protective effects of a natural product, curcumin, against amyloid $\beta$ induced mitochondrial and synaptic toxicities in Alzheimer's disease" J Invest Med; Aug. 2016; 64(8): 1220-1234.

Reddy et al. "Protective effects of Indian spice curcumin against amyloid beta in Alzheimer's disease" J Alzheimers Dis; Feb. 2018; 61(3): 843-866.

Reddy et al. "Targeting the endocannabinoid system: A predictive, preventive, and personalized medicine-directed approach to the management of brain pathologies" EPMA J; Apr. 2020; 11(2): 217-250.

Rosenberg et al. "Therapeutic effects of cannabinoids in animal models of seizures, epilepsy, epileptogenesis, and epilepsy-related neuroprotection" Epilepsy Behav; May 2017; 70(part B): 319-327.

Roy et al. "Regulation of melatonin and neurotransmission in Alzheimer's disease" Int J Mol Sci; Jun. 2021; 22(13): 6841, doi: 10.3390/ijms22136841, 17 pages.

Rudnitskaya et al. "Melatonin attenuates memory impairment, amyloid-$\beta$ accumulation, and neurodegeneration in a rat model of sporadic Alzheimer's disease" J Alzheimers Dis; Jul. 2015; 47(1): 103-116.

Ruthirakuhana et al. "Investigating the safety and efficacy of nabilone for the treatment of agitation in patients with moderate-to-severe Alzheimer's disease: Study protocol for a cross-over randomized controlled trial" Contemp Clin Trials Commun; May 2019; 15: 100385, doi: 10.1016/j.conctc.2019.100385, seven pages.

Ruver-Martins et al. "Cannabinoid extract in microdoses ameliorates mnemonic and nonmnemonic Alzheimer's disease symptoms: A case report" J Med Case Rep; Jul. 2022; 16(1): 277, doi: 10.1186/s13256-022-03457-w, seven pages.

Salthouse "When does age-related cognitive decline begin?" Neurobiol Aging; Apr. 2009; 30(4): 507-514.

Sarne et al. "The dual neuroprotective-neurotoxic profile of cannabinoid drugs" Br J Pharmacol; Aug. 2011; 163(7): 1391-1401.

Sarne "THC for age-related cognitive decline?" Aging; Nov. 2018; 10(12): 3628-3629.

Sarne "Beneficial and deleterious effects of cannabinoids in the brain: The case of ultra-dose THC" Am J Drug Alcohol Use; Mar. 2019; 45(6): 551-562.

Sarris et al. "Medicinal cannabis for psychiatric disorders: A clinically-focused systematic review" BMC Psychiatry; Jan. 2020; 20(1): 24, doi: 10.1186/s12888-019-2409-8, 14 pages.

Schott et al. "New criteria for Alzheimer's disease: Which, when and why?" Brain; May 2015 ePub Apr. 2015; 138 (pt 5): 1134-1137.

Schreiner & Popescu "Impact of caffeine on Alzheimer's disease pathogenesis—Protective or risk factor?" Life (Basel); Feb. 2022; 12(3): 330, doi: 10.3390/life12030330, 18 pages.

Scott et al. "Association of cannabis with cognitive functioning in adolescents and young adults: A systematic review and meta-analysis" JAMA Psychiatry; Jun. 2018; 75(6): 585-595.

Scott et al. "A systematic review of the neurocognitive effects of cannabis use in older adults" Cur Addict Rep; Dec. 2019; 6(4): 443-455.

(56) References Cited

OTHER PUBLICATIONS

Schubert et al. "Efficacy of cannabinoids is a pre-clinical drug-screening platform for Alzheimer's disease" Mol Neurobiol; Nov. 2019 ePub May 2019; 56(11): 7719-7730.
Scuteri et al. "NAbiximols clinical translation to the treatment of pain and agitation in severe dementia (NACTOPAISD): Clinical trial protocol" Biomed Pharmacother; Sep. 2022 ePub Aug. 2022; 153: 113488; doi: 10.1016/j.biopha.2022.113488, seven pages.
Shabbir et al. "Curcumin and its derivatives as theranostic agents in Alzheimer's disease: The implication of nanotechnology" Int J Mol Sci; Dec. 2020; 22(1): 196, doi: 10.3390/ijms22010196, 23 pages.
Shahbazi et al. "Cannabinoids and cannabinoid receptors: The story so far" iScience; Jul. 2020; 23: 101301, doi: 0.1016/j.isci.2020.10130, 22 pages.
Sharma & Kumar "Nature's derivative(s) as alternative anti-Alzheimer's disease treatments" J Alzheimers Dis Rep; Nov. 2019; 3(1): 279-297.
Sharpe et al. "Cannabis, a cause for anxiety? A critical appraisal of the anxiogenic and anxiolytic properties" J Transl Med; Oct. 2020; 18(1): 374, doi: 10.1186/s12967-020-02518-2, 21 pages.
Shelef et al. "Safety and efficacy of medical cannabis oil for behavioral and psychological symptoms of dementia: An-open label, add-on, pilot study" J Alzheimers Dis; Feb. 2016; 51(1): 15-19.
Silvestro et al. "A state of the art of antioxidant properties of curcuminoids in neurodegenerative diseases" Int J Mol Sci; Mar. 2021; 22(6): 3168, doi: 10.3390/ijms22063168, 27 pages.
Singer et al. "A multicenter, placebo-controlled trial of melatonin for sleep disturbance in Alzheimer's disease" Sleep; Nov. 2003; 26(7): 893-901.
Small et al. "Memory and brain amyloid and tau effects of a bioavailable form of curcumin in non-demented adults: A double-blind, placebo-controlled 18-month trial" Am J Geriatr Psychiatry; Mar. 2018; 26(3): 266-277.
Solvay Pharmaceuticals, Inc. "Marinol (dronabinol) capsules" NDA 18-651/S-021; Sep. 2004; www.accessdata.fda.gov/drugsatfda_docs/label/2005/018651s021lbl.pdf, 11 pages.
Srinivasan et al. "Melatonin in Alzheimer's disease and other neurodegenerative disorders" Behav Brain Funct; May 2006; 2: 15, doi: 10.1186/1744-9081-2-15, 23 pages.
Stazi et al. "Long-term caffeine treatment of Alzheimer mouse models ameliorates behavioural deficits and neuron loss and promotes cellular and molecular markers of neurogenesis" Cell Mol Life Sci; Jan. 2022 ePub Dec. 2021; 79(1): 55, doi: 10.1007/s00018-021-04062-8, 18 pages.
Stazi et al. "A combination of caffeine supplementation and enriched environment in an Alzheimer's disease mouse model" Int J Mol Sci; Jan. 2023; 24(3): 2155, doi: 10.3390/ijms24032155, 15 pages.
Stella et al. "Medical cannabinoids for treatment of neuropsychiatric symptoms in dementia: A systematic review" Trends Psychiatry Psychother; Jul. 2021; 43(4): 243-255.
Stella et al. "Cannabinoid formulations and delivery systems: Current and future options to treat pain" Drugs; Sep. 2021; 81:(13) 1513-1557.
Stout & Cimino "Exogenous cannabinoids as substrates, inhibitors, and inducers of human drug metabolizing enzymes: A systematic review" Drug Metab Rev; Feb. 2014; 46(1): 86-95.
Sun et al. "Rutin prevents tau pathology and neuroinflammation in a mouse model of Alzheimer's disease" J Neuroinflammation; Jun. 2021; 18(1): 131, doi: 0.1186/s12974-021-02182-3, 14 pages.
Svob Strac et al. "Personalizing the care and treatment of Alzheimer's disease: An overview" Pharmgenomics Pers Med; May 2021; 14: 631-653.
IGC Pharma "IGC Pharma announces positive interim results for IGC-AD1 in reducing Alzheimer's agitation" IGC Pharma press release, Potomac, MD; Mar. 20, 2024; three pages.
Charernboon et al. "Effectiveness of cannabinoids for treatment of dementia: A systematic review of randomized controlled trials" Clin Gerontol; Jan.-Feb. 2021; 44(1): 16-24.
Cohen et al. "Study rationale and baseline data for pilot trial of dronabinol adjunctive treatment of agitation in Alzheimer's dementia (THC-AD)" Int Psychogeriatr; Oct. 2021; doi: 10.1017/S1041610221001150, six pages.
Hoch et al. "How effective and safe is medical cannabis as a treatment of mental disorders? A systematic review" Eur Arch Psychiatry Clin Neurosci; Jan. 2019; 269(1): 87-105.
Krishnan et al. "Cannabinoids for the treatment of dementia" Cochrane Database Syst Rev; Apr. 2009; 2009(2): CD007204, doi: 10.1002/14651858.CD007204.pub2, 21 pages.
Paunescu et al. "A systematic review of clinical studies on the effect of psychoactive cannabinoids in psychiatric conditions in Alzheimer dementia" Am J Ther; May/Jun. 2020; 27(3): e249-e269.
Ruthirakuhan et al. "Natural and synthetic cannabinoids for agitation and aggression in Alzheimer's disease: A meta-analysis" J Clin Psychiatry; Jan. 2019; 80(2): 18r12617, doi: 10.4088/JCP.18r12617, 13 pages.
Tampi et al. "Cannabinoids for the treatment of behavioral and psychological symptoms of dementia" Neurodegener Dis Manag; Aug. 2018 ePub Jul. 2018; 8(4): 211-213, doi: 10.2217/nmt-2018-0019.
Weier & Hall "The use of cannabinoids in treating dementia" Curr Neurol Neurosci Rep; Aug. 2017; 17(8): 56, doi: 10.1007/s11910-017-0766-6, nine pages.
Defrancesco & Hofer "Cannabinoid as beneficial replacement therapy for psychotropics to treat neuropsychiatric symptoms in severe Alzheimer's dementia" Front Psychiatry; May 2020; 11: 413, doi: 10.3389/fpsyt.2020.00413, four pages.
DeMuro et al. "The absolute bioavailability of oral melatonin" J Clin Pharmacol; Jul. 2000; 40(7): 781-784.
Devitt-Lee "Pot is hot—What you need to know" Sonoma Med; Oct. 2017; 68(4): 33-48.
Devitt-Lee A Primer on Cannabinoid-Drug Interactions; Project CBD; Oct. 2018; 33 pages.
Dragicevic et al. "Melatonin treatment restores mitochondrial function in Alzheimer's mice: A mitochondrial protective role of melatonin membrane receptor signaling" J Pineal Res; Aug. 2011 ePub Mar. 2011; 51(1): 75-86.
Dragicevic et al. "Caffeine increases mitochondrial function and blocks melatonin signaling to mitochondria in Alzheimer's mice and cells" Neuropharmacology; Dec. 2012; 63(8): 1368-1379.
Dubbelman et al. "Decline in cognitively complex everyday activities accelerates along the Alzheimer's disease continuum" Alzheimers Res Ther; Oct. 2020; 12(1): 138, doi: 10.1186/s13195-020-00706-2, 11 pages.
Van den Elsen et al. "Tetrahydrocannabinol for neuropsychiatric symptoms in dementia" Neurology; Jun. 2015; 84(23): 2338-2346.
Enogieru et al. "Rutin as a potent antioxidant: Implications for neurodegenerative disorders" Oxid Med Cell Longev; Jun. 2018; 2018: 6241017, doi: 10.1155/2018/6241017, 17 pages.
Esposito et al. "The marijuana component cannabidiol inhibits β-amyloid-induced tau protein hyperphosphorylation through Wnt/β-catenin pathway rescue in PC12 cells" J Mol Med (Berl); Mar. 2006; 84(3): 253-258.
Esposito et al. "Cannabidiol inhibits inducible nitric oxide synthase protein expression and nitric oxide production in 3-amyloid stimulated PC12 neurons through p38 MAP kinase and NF-κB involvement" Neurosci Lett; May 2006; 399(1-2): 91-95.
Esposito et al. "Cannabidiol in vivo blunts β-amyloid induced neuroinflammation by suppressing IL-1β and iNOS expression" Br J Pharmacol; Aug. 2007; 151(8): 1272-1279.
Eubanks et al. "A molecular link between the active component of marijuana and Alzheimer's disease pathology" Mol Pharm; Nov.-Dec. 2006; 3(6): 773-777.
Fasinu et al. "Current status and prospects for cannabidiol preparations as new therapeutic agents" Pharmacotherapy; Jul. 2016; 36(7): 781-796.
Feng et al. "Melatonin alleviates behavioral deficits associated with apoptosis and cholinergic system dysfunction in the APP 695 transgenic mouse model of Alzheimer's disease" J Pineal Res; Sep. 2004; 37(2): 129-136.

(56) References Cited

OTHER PUBLICATIONS

Fihurka et al. "The memory benefit to aged APP/PS1 mice from long-term intranasal treatment of low-cose THC" Int J Mol Sci; Apr. 2022; 23(8): 4253, doi: 10.3390/ijms23084253, 16 pages.
Fishbein et al. "Long-term behavioral and biochemical effects of an ultra-low dose of Δ9-tetrahydrocannabinol (THC): Neuroprotection and ERK signaling" Exp Brain Res; Jul. 2012; 221(4): 437-448.
Garcia-Mesa et al. "Melatonin plus physical exercise are highly neuroprotective in the 3xTg-AD mouse" Neurobiol Aging; Jun. 2012; 33(6): 1124e13-1124.e29, doi: 10.1016/j.neurobiolaging.2011.11.016, 37 pages.
Giacoppo et al. "Cannabinoids: New promising agents in the treatment of neurological diseases" Molecules; Nov. 2014; 19(11): 18781-18816, doi: 10.3390/molecules191118781, 36 pages.
Gonçalves et al. "Cannabis and its secondary metabolites: Their use as therapeutic drugs, toxicological aspects, and analytical determination" Medicines; Feb. 2019; 6(1): 31, doi: 10.3390/medicines6010031, 47 pages.
Gonçalves et al. "Terpenoids, cannabimimetic ligands, beyond the Cannabis plant" Molecules; Mar. 2020; 25(7): 1567, doi: 10.3390/molecules25071567, 47 pages.
Goozee et al. "Examining the potential clinical value of curcumin in the prevention and diagnosis of Alzheimer's disease" Br J Nutr; Feb. 2016; 115(3): 449-465.
Gorey et al. "Age-related differences in the impact of cannabis use on the brain and cognition: A systematic review" Eur Arch Psych Clin Neurosci; Feb. 2019; 269(1): 37-58.
Graczyk et al. "Prospects for the use of cannabinoids in psychiatric disorders" Front Psychiatry; Mar. 2021; 12: 620073, doi: 10.3389/fpsyt.2021.620073, nine pages.
Greenwich Biosciences, Inc. "Epidiolex (cannabidiol) oral solution prescribing information" Reference ID: 4282447; Jun. 2018; www.accessdata.fda.gov/drugsatfda_docs/label/2018/210365lbl.pdf, 30 pages.
Gülck & Møller "Phytocannabinoids: Origins and biosynthesis" Trends Plant Sci; Oct. 2020 ePub Jul. 2020; 25(10): 985-1004.
Habtemariam "Rutin as a natural therapy for Alzheimer's disease: Insights into its mechanisms of action" Curr Med Chem; Feb. 2016; 23(9): 860-873.
Hardeland "Melatonin in aging and disease—Multiple consequences of reduced secretion, options and limits of treatment" Aging Dis; Apr. 2012; 3(2): 194-225.
Hardeland "Divergent importance of chronobiological considerations in high- and low-dose melatonin therapies" Diseases; Mar. 2021; 9(1): 18, doi: 10.3390/diseases9010018, 16 pages.
Hermann et al. "Randomized placebo-controlled trial of nabilone for agitation in Alzheimer's disease" Am J Geriatr Psychiatry; Nov. 2019; 27(11): 1161-1173.
Hillen et al. "Safety and effectiveness of cannabinoids for the treatment of neuropsychiatric symptoms in dementia: A systematic review" Ther Adv Drug Saf; May 2019; 10: 2042098619846993; doi: 10.1177/2042098619846993, 23 pages.
Huestis "Human cannabinoid pharmacokinetics" Chem Biodivers; Aug. 2007; 4(8): 1770-1804.
Hunt & Jones "Tolerance and disposition of tetrahydrocannabinol in man" J Pharmacol Exp Ther; Nov. 1980; 215(1): 35-44.
Iffland & Grotenhermen "An update on safety and side effects of cannabidiol: A review of clinical data and relevant animal studies" Cannabis Cannabinoid Res; Jun. 2017; 2(1): 139-154.
Insys Therapeutics, Inc. "Syndros (dronabinol) oral solution" Reference ID: 4103077; May 2017; www.accessdata.fda.gov/drugsatfda_docs/label/2017/205525s003lbl.pdf, 27 pages.
Irwin "Healthy aging and dementia: Two roads diverging in midlife" Front Aging Neurosci; Sep. 2018; 10: 275, doi: 0.3389/fnagi.2018.0027, 12 pages.
Jahromi et al. "Herbal medicine for pain management: Efficacy and drug interactions" Pharmaceutics; Feb. 2021; 13(2): 251, doi: 10.3390/pharmaceutics13020251, 30 pages.
Jia et al. "Potential therapeutic strategies for Alzheimer's disease targeting or beyond β-amyloid: Insights from clinical trials" Biomed Res Int; Jul. 2014; 2014: 837157, doi: 10.1155/2014/837157, 22 pages.
Thakur et al. "Natural cannabinoids: Templates for drug discovery" Life Sci; Dec. 2005 ePub Oct. 2005; 78(5): 454-466.
Thakur et al. "Pathophysiology and management of Alzheimer's disease: An overview" J Anal Pharm Res; Apr. 2018; 7(2): 226-235.
Timler et al. "Use of cannabinoid-based medicine among older residential care recipients diagnosed with dementia: Study protocol for a double-blind randomised crossover trial" Trials; Feb. 2020; 21(1): 188, doi: 10.1186/s13063-020-4085-x, 11 pages.
Uddin et al. "Emerging promise of cannabinoids for the management of pain and associated neuropathological alterations in Alzheimer's disease" Front Pharmacol; Jul. 2020; 11: 1097, doi: 10.3389/fphar.2020.01097, 13 pages.
Vacaflor et al. "Mental health and cognition in older cannabis users: A review" Can Geriatr J; Sep. 2020; 23(3): 242-249.
Valeant Pharmaceuticals "Cesamet (nabilone) capsules" NDA 18-677/S-011; May 2006; www.accessdata.fda.gov/drugsatfda_docs/label/2006/018677s011lbl.pdf, 11 pages.
Velayudhan et al. "Safety and tolerability of natural and synthetic cannabinoids in adults aged over 50 years: A systematic review and meta-analysis" PLoS Med; Mar. 2021; 18(3): e1003524, doi: 10.1371/journal.pmed.1003524, 42 pages.
Vergallo "Nutraceutical vegetable oil nanoformulations for prevention and management of diseases" Nanomaterials (Basel); Jun. 2020; 10(6): 1232, doi: 10.3390/nano10061232, 32 pages.
Vitale et al. "The (poly)pharmacology of cannabidiol in neurological and neuropsychiatric disorders: Molecular mechanisms and targets" Int J Mol Sci; May 2021; 22(9): 4876, doi: 10.3390/ijms22094876, 20 pages.
Volicer et al. "Effects of dronabinol on anorexia and disturbed behavior in patients with Alzheimer's disease" Int J Geriatr Psych; Sep. 1997; 12(9): 913-919.
Wade et al. "Add-on prolonged-release melatonin for cognitive function and sleep in mild to moderate Alzheimer's disease: A 6-month, randomized, placebo-controlled, multicenter trial" Clin Interv Aging; Jun. 2014; 9: 947-961.
Walther et al. "Delta-9-tetrahydrocannabinol for nighttime agitation in severe dementia" Psychopharmacology; May 2006 ePub Mar. 2006; 185(4): 524-528.
Walther & Halpern "Cannabinoids and dementia: A review of clinical and preclinical data" Pharmaceuticals (Basel); Aug. 2010; 3(8): 2689-2708.
Wang & Wang "Role of melatonin in Alzheimer-like neurodegeneration" Acta Pharmacol Sin; Jan. 2006; 27(1): 41-49.
Wang et al. "Rutin inhibits β-amyloid aggregation and cytotoxicity, attenuates oxidative stress, and decreases the production of nitric oxide and proinflammatory cytokines" Neurotoxicology; Mar. 2012; 33(3): 482-490.
Wang et al. "Targeting multiple pathogenic mechanisms with polyphenols for the treatment of Alzheimer's disease—experimental approach and therapeutic implications" Front Aging Neurosci; Mar. 2014; 6: 42, doi: 10.3389/fnagi.2014.00042, ten pages.
Wang et al. "Low-dose delta-9-tetrahydrocannabinol as beneficial treatment for aged APP/PS1 mice" Int J Mol Sci; Mar. 2022; 23(5): 2757, doi: 10.3390/ijms23052757, 26 pages.
Watt & Karl "In vivo evidence for therapeutic properties of cannabidiol (CBD) for Alzheimer's disease" Front Pharmacol; Feb. 2017; 8: 20, doi: 10.3389/fphar.2017.00020, seven pages.
Xu et al. "Rutin improves spatial memory in Alzheimer's disease transgenic mice by reducing Aβ oligomer level and attenuating oxidative stress and neuroinflammation" Behav Brain Res; May 2014 ePub Feb. 2014; 264: 173-180.
Zakaria et al. "The potential role of melatonin on memory function: Lessons from rodent studies" Folia Biol; May 2016; 62(5): 181-187.
Zendulka et al. "Cannabinoids and cytochrome P450 interactions" Curr Drug Metab; 2016; 17(3): 206-226.
Zeyl et al. "What do you know about Maryjane: A systematic review of the current data on the THC:CBD ratio" Subst Use Misuse; Mar. 2020; 55(8): 1223-1227.

(56) References Cited

OTHER PUBLICATIONS

Zhornitsky & Potvin "Cannabidiol in humans—The quest for therapeutic targets" Pharmaceuticals (Basel); May 2012; 5(5): 529-552.
Zuardi "History of cannabis as a medicine: A review" Rev Bras Psiquiatr; Jun. 2006;28(2): 153-157.
Zuardi "Cannabidiol: From an inactive cannabinoid to a drug with wide spectrum of action" Rev Bras Psiquiatr; Sep. 2008; 30(3): 271-280.
ISA/US "International Search Report" and "Written Opinion of the ISA" for parent Application No. PCT/US2019/000014 dated Jun. 14, 2019; 11 pages.
WIPO "International Preliminary Report on Patentability" for parent Application No. PCT/US2019/000014 dated Oct. 6, 2020; seven pages.
Laboratorio Franco Colombiano S.A.S.—Lafrancol S.A.S. "Opposition" dated Feb. 16, 2021 against corresponding Colombian Application No. NC2020/0013182 with English translation.
Superintendencia de Industria y Comercio "Office Action No. 17586" dated Oct. 27, 2022 for corresponding Colombian Application No. NC2020/0013182 with partial English translation.
European Patent Office "Supplementary European search report" & "European search opinion" dated May 10, 2022 for corresponding European Application No. 19777467.2, 12 pages.
Instituto Mexicano de la Propiedad Industrial "First Office Action No. 72789" dated Aug. 10, 2022 for corresponding Mexican Application No. MX/a/2020/010284 with partial English translation.
Instituto Mexicano de la Propiedad Industrial "Second Office Action No. 1686" dated Jan. 17, 2023 for corresponding Mexican Application No. MX/a/2020/010284 with partial English translation.
US Patent and Trademark Office "Non-Final Office Action" dated May 2, 2022 for parent U.S. Appl. No. 17/042,333, 18 pages.
US Patent and Trademark Office "Final Office Action" dated Nov. 14, 2022 for parent U.S. Appl. No. 17/042,333, 14 pages.
Instituto Mexicano de la Propiedad Industrial "Third Office Action No. 49231" received Jun. 16, 2023 for corresponding Mexican Application No. MX/a/2020/010284 with partial English translation.
IGC Pharma "IGC Pharma announces positive interim results for IGC-AD1 in reducing Alzheimer's agitation" shortened version From the Desk of the CEO, Potomac, MD; Mar. 20, 2024; two pages.
IGC Pharma "IGC Pharma releases positive interim analysis of its ongoing Phase 2 trial in Alzheimer's research" From the Desk of the CEO, Potomac, MD; Apr. 5, 2024; three pages.
IGC Pharma "IGC-AD1's interim Phase 2 data show a reduction in Alzheimer's agitation at week two" From the Desk of the CEO, Potomac, MD; Apr. 17, 2024; three pages.
IGC Pharma "IGC Pharma announces positive interim results for IGC-AD1 in reducing Alzheimer's agitation in Its ongoing Phase 2 clinical trial" From the Desk of the CEO, Potomac, MD; Apr. 25, 2024; three pages.
IGC Pharma "Recap of AAIC24 conference participation and poster presentations" From the Desk of the CEO, Potomac, MD; Aug. 28, 2024; nine pages.
IGC Pharma "IGC Pharma advances IGC-AD1 toward clinical trials as a potential anti-amyloid plaque treatment for Alzheimer's disease" Press Release, Potomac, MD; Sep. 4, 2024; two pages.
IGC Pharma "IGC Pharma announces additional data supporting IGC-AD1 as an Alzheimer's treatment" Press Release, Potomac, MD; Sep. 18, 2024; three pages.
Bhoopatiraju & Grossberg "Emerging perspectives in the management of agitation in Alzheimer's disease and patients with dementia" touchREV Neurol; Jun. 2022; 18(1): 7-13.
Caraci et al. "New antipsychotic drugs for the treatment of agitation and psychosis in Alzheimer's disease: Focus on brexpiprazole and pimavanserin" F1000Res; Jul. 2020 last updated Nov. 2024; 9(Faculty Rev): 686, doi: 10.12688/f1000research.22662.1, nine pages.
Carrarini et al. "Agitation and dementia: Prevention and treatment strategies in acute and chronic conditions" Front Neurol; Apr. 2021; 12: 644317, doi: 10.3389/fneur.2021.644317, 18 pages.
Cesana et al. "A confirmatory and an exploratory factor analysis of the Cohen-Mansfield Agitation Inventory (CMAI) in a European case series of patients with dementia: Results from the RECage Study" Brain Sci; Jul. 2023; 13(7): 1025, doi: 10.3390/brainsci13071025, 15 pages.
Cohen-Mansfield "Instruction Manual for the Cohen-Mansfield Agitation Inventory (CMAI)" www.dementiaresearch.org.au/wp-content/uploads/2016/06/CMAI_Manual.pdf; 1991; 37 pages.
Cohen-Mansfield "Agitated behavior in persons with dementia: The relationship between type of behavior, its frequency, and its disruptiveness" J Psychiatr Res; Nov. 2008; 43(1): 64-69, doi: 10.1016/j.jpsychires.2008.02.003.
Cummings et al. "Agitation in cognitive disorders: International Psychogeriatric Association provisional consensus clinical and research definition" Int Psychogeriatr; Jan. 2015 ePub Oct. 2014; 27(1): 7-17.
Cummings et al. "Clinical trials for disease-modifying therapies in Alzheimer's disease: A primer, lessons learned, and a blueprint for the future" J Alzheimers Dis; Jan. 2018 ePub Mar. 2018; 64(suppl 1): S3-S22.
Cummings et al. "Treatment combinations for Alzheimer's disease: Current and future pharmacotherapy options" J Alzheimers Dis; Jan. 2019; 67(3): 779-794.
Cummings "Disease modification is not all—We need symptomatic therapies for Alzheimer disease" Nat Rev Neurol; Jan. 2022; 18(1): 3-4, doi: 10.1038/s41582-021-00591-9, three pages.
Cummings et al. "Alzheimer's disease: Novel targets and investigational drugs for disease modification" Drugs; Oct. 2023 ePub Sep. 2023; 83(15): 1387-1408.
Cummings et al. "The therapeutic landscape of tauopathies: Challenges and prospects" Alzheimers Res Ther; Oct. 2023; 15(1): 168, doi: 10.1186/s13195-023-01321-7, 17 pages.
Dixon & Cadenhead "Cannabidiol versus placebo as adjunctive treatment in early psychosis: Study protocol for randomized controlled trial" Trials; Nov. 2023; 24(1): 775, doi: 10.1186/s13063-023-07789-w, 14 pages.
Elmaleh et al. "Developing effective Alzheimer's disease therapies: Clinical experience and future directions" J Alzheimers Dis; Jan. 2019 ePub Aug. 2019; 71(3): 715-732.
Hermush et al. "Effects of rich cannabidiol oil on behavioral disturbances in patients with dementia: A placebo controlled randomized clinical trial" Front Med; Sep. 2022; 9: 951889, doi: 10.3389/fmed.2022.951889, 14 pages.
Imbido et al. "Emerging pharmacological approaches for psychosis and agitation in Alzheimer's disease" CNS Drugs; ePub Dec. 2024; doi: 0.1007/s40263-024-01133-9, 18 pages.
Kim et al. "Alzheimer's disease: Key insights from two decades of clinical trial failures" J Alzheimers Dis; Jan. 2022 ePub Mar. 2022; 87(1): 83-100.
Kupeli et al. "Psychometric evaluation of the Cohen-Mansfield Agitation Inventory in an acute general hospital setting" Int J Geriatr Psychiatry; Jan. 2018 ePub May 2017; 33(1): e158-e165, doi: 10.1002/gps.4741.
Meunier et al. "Defining a clinically meaningful within-patient change threshold for the Cohen-Mansfield Agitation Inventory in Alzheimer's dementia" Front Neurosci; Jul. 2024; 15: 1379062, doi: 10.3389/fneur.2024.1379062, 10 pages.
Omotayo et al. "A narrative review of the therapeutic and remedial prospects of cannabidiol with emphasis on neurological and neuropsychiatric disorders" J Cannabis Res; Mar. 2024; 6(1): 14, doi: 10.1186/s42238-024- 00222-2, 26 pages.
Park et al. "Emerging therapeutic opportunities for Alzheimer's disease psychosis" Preprints.org; Oct. 2024; doi: 10.20944/preprints202410.2470.v1, 16 pages.
Pless et al. "Understanding neuropsychiatric symptoms in Alzheimer's disease: Challenges and advances in diagnosis and" Front Neurosci; Sep. 2023; 17: 1263771, doi: 10.3389/fnins.2023.1263771, 13 pages.
Ride With Larry "Medical Marijuana and Parkinson's Part 3 of 3" YouTube; posted Nov. 2016; https://www.youtube.com/watch?v=

(56) References Cited

OTHER PUBLICATIONS zNT8Zo_sfwo from the documentary Ride With Larry, recorded in San Diego, CA(?); 2' 33" duration with autogenerated transcript of two pages.

Sano et al. "Agitation in cognitive disorders: Progress in the International Psychogeriatric Association consensus clinical and research definition" Int Psychogeriatr; Apr. 2024 ePub Mar. 2023; 36(4): 238-250.

Trojan et al. "The main therapeutic applications of cannabidiol (CBD) and its potential effects on aging with respect to Alzheimer's disease" Biomolecules; Sep. 2023; 13(10): 1446, doi: 10.3390/biom13101446, 13 pages.

Thangwaritorn et al. "A review of recent advances in the management of Alzheimer's disease" Cureus; Apr. 2024; 16(4): e58416; doi: 10.7759/cureus.58416, 16 pages.

Wise & Aga "Managing agitation in Alzheimer's disease: 5 things to know" Medscape; Jul. 2024; www.medscape.com/viewarticle/managing-agitation-alzheimers-disease-5-things-know-2024a1000caf?form=fpf; two pages.

Yiannopoulou & Papageorgiou "Current and future treatments in Alzheimer disease: An update" J Cent Nerv Syst Dis; Feb. 2020; 12: 1179573520907397, doi: 10.1177/1179573520907397, 12 pages.

Zhang et al. "Recent advances in Alzheimer's disease: Mechanisms, clinical trials and new drug development strategies" Signal Transduct Target Ther; Aug. 2024; 9(1): 211, doi: 10.1038/s41392-024-01911-3, 35 pages.

Zuidema et al. "Assessing neuropsychiatric symptoms in nursing home patients with dementia: Reliability and Reliable Index of the Neuropsychiatric Inventory and the Cohen-Mansfield Agitation Inventory" Int J Geriatr Psychiatry; Feb. 2011; 26(2): 127-134, doi: 10.1002/gps.2499.

* cited by examiner

METHOD AND COMPOSITION FOR TREATING CNS DISORDERS

CROSS-REFERENCE TO RELATED APPLICATIONS

This is a division of application Ser. No. 17/042,333, filed Sep. 28, 2020; which is the national stage of Application No. PCT/US2019/000014, filed Mar. 29, 2019; which claims the benefit of provisional Application No. 62/650,942, filed Mar. 30, 2018.

FIELD

This invention relates to compositions and methods for treating a range of Central Nervous System (CNS) disorders and diseases such as amyloidosis, protein folding diseases, tauopathy, and specifically, for example, Alzheimer's Disease (AD) and Parkinson's Disease (PD), among others, in humans and animals using a formulation comprising a combination of a *cannabis* compound, or compounds, melatonin, and turmeric.

BACKGROUND

Alzheimer'S Disease (AD)

About 43 million suffer from Alzheimer's Disease ("AD") worldwide. The estimated economic burden in 2017 was over $200 billion for AD-related services. By 2050, an estimated 11 to 16 million Americans will be living with the disease. Several clinical trials had indicated that combination therapy has greater efficacy over monotherapy. (Alzheimer's Association, 2012 Alzheimer's disease facts and figures. Alzheimer's Dement. 2012; 8: 131-168; Brookmeyer, et al., Forecasting the global burden of Alzheimer's disease. Alzheimer's Dement. 2007; 3: 186-191; Schitt, et al., CNS Drugs 2004; 18: 827-844).

AD poses an enormous burden on caregivers, as well as the health care system. About 30 percent of the cost of treating AD is the cost of caregivers. Currently, there is no cure for AD. (Saxena, Bioenergetics breakdown in Alzheimer's disease: Targets for new therapies. Int J Physiol Pathophysiol Pharmacol. 2011; 3: 133-139; Götz, et al., Modes of Aβ toxicity in Alzheimer's disease. Cell Mol Life Sci. 2011; 68: 3359-3375).

AD pathology can be grouped into two forms, familial inherited AD and sporadic AD. The pathologies of early-onset familial AD and late-onset sporadic AD are indistinguishable. The two forms of AD are characterized by extracellular amyloid-β (Aβ) peptide plaque deposits, and by tau-containing neurofibrillary tangles (Götz, et al., Modes of Aβ toxicity in Alzheimer's disease. Cell Mol Life Sci. 2011; 68: 3359-3375).

The misfolded structure of the Aβ peptides, alongside with neurofibrillary tangles, makes a characteristic tendency for their aggregation around damaged or dead neurons and within cerebral vasculature in the brain. It establishes by memory loss followed by advanced AD. (Chiti & Dobson, Protein misfolding, functional amyloid, and human disease. Annu Rev Biochem. 2006; 75: 333-366).

It has long been agreed that Aβ1-40 (Aβ40) and Aβ1-42 (Aβ42) aggregates are the constituents of the insoluble plaques that are characteristic of AD. This disease is also accompanied with neuro-inflammation, excitotoxicity, and oxidative stress. (Campbell & Gowran, Alzheimer's disease; taking the edge off with cannabinoids? Br J Pharmacol. 2007; 152: 655-662; Rich, et al., Nonsteroidal anti-inflammatory drugs in Alzheimer's disease. Neurology. 1995; 45: 51-55). However, the continuous aggregation of Aβ peptides along with hyper-phosphorylation of tau protein inside the cell, producing neurofibrillary tangle formation, are generally recognized as the major etiological factors of the neuronal cell death associated with the evolution of AD (Octave, The amyloid peptide and its precursor in Alzheimer's disease. Rev Neurosci. 1995; 6: 287-316; Reitz, et al., Epidemiology of Alzheimer disease. Nat Rev Neural. 2011; 7: 137-152; Pillay, et al., Molecular mechanisms, emerging etiological insights and models to test potential therapeutic interventions in Alzheimer's disease. Curr Alzheimer Res. 2004; 1: 295-306).

The studies show that Aβ peptides are neurotoxic, as they are reported intermediaries of apoptosis, inflammation, and oxidative stress. For this purpose, some of the initial proposed therapeutic strategies involve the prevention or elimination of these Aβ peptides and following formation of toxic oligomers. Aβ peptides are produced via the amyloidogenic pathway of amyloid precursor protein (APP) proteolysis, which involves the combined effort of β- and γ-secretases. Initially, β-secretase (BACE) cleaves APP, creating an Aβ-containing carboxyl-terminal fragment known as β-C-terminal fragment (β-CTF), or C99 and an amino-terminal, soluble APP-β (sAPP-β) fragment, which is released extracellularly. Intracellularly, the β-CTF fragment is then cleaved by a multiprotein γ-secretase complex, resulting in production of the Aβ peptide and a smaller γ-CTF, also known as C57. Aβ is known to surge: cellular $Ca^{2+}$, mitochondrial progression of the disease condition.

Prior studies have also suggested that glycogen synthase kinase 3 (GSK-3) has a key role in the pathogenesis of both sporadic and familial AD (Hooper, et al., The GSK3 hypothesis of Alzheimer's disease. J Neurochem. 2008; 104: 1433-1439; Proctor & Gray, GSK3 and p53—Is there a link in Alzheimer's disease?Mol Neurodegener. 2010; 5: 7).

It has been demonstrated that GSK-3β induces hyper-phosphorylation of tau. (Lovestone, et al., Alzheimer's disease-like phosphorylation of the microtubule-associated protein tau by glycogen synthase kinase-3 in transfected mammalian cells. Curr Biol. 1994; 4: 1077-1086;

Ishiguro, et al., Phosphorylation sites on tau by tau protein kinase I, a bovine-derived kinase generating an epitope of paired helical filaments. Neurosci Lett. 1992; 148: 202-206;

Hanger, et al., Glycogen synthase kinase-3 induces Alzheimer's disease-like phosphorylation of tau: Generation of paired helical filament epitopes and neuronal localization of the kinase. Neurosci Lett. 1992; 147: 58-62;

Cho & Johnson, Glycogen synthase kinase 33 phosphorylates tau at both primed and unprimed sites. Differential impact on microtubule binding. J Biol Chem. 2003; 278: 187-193;

Asuni, et al., GSK3α exhibits β-catenin and tau directed kinase activities that are modulated by Wnt. Eur J Neurosci. 2006; 24: 3387-3392).

Furthermore, overexpression of GSK-3 in Tet/GSK-3β mice exhibit pathological symptoms that parallel AD pathology with respect to spatial learning deficits, reactive astrocytosis, increased Aβ production, and plaque-associated inflammation, as well as tau hyperphosphorylation resulting in Aβ-mediated neuronal death (Hernandez, et al., GSK3 and tau: Two convergence points in Alzheimer's disease. J Alzheimers Dis. 2013; 33 (Suppl 1): S141-S144).

Moreover, chronic lithium (GSK-3 inhibitor) usage in transgenic mice overexpressing GSK-3β and tau has shown to check tau hyperphosphorylation and neurofibrillary tangle formation (Engel, et al., Chronic lithium administration to FTDP-17 tau and GSK-3β overexpressing mice checks tau hyperphosphorylation and neurofibrillary tangle formation, but pre-formed neurofibrillary tangles do not revert. J Neurochem. 2006; 99: 1445-1455). Some reports have also demonstrated that GSK-3a plays a role in regulating amyloid-β protein precursor (AβPPP) cleavage, resulting in increased Aβ production (Phiel, et al., GSK-3α controls production of Alzheimer's disease amyloid-β peptides. Nature. 2003; 423: 435-439; Sun, et al., Lithium inhibits amyloid secretion in COS7 cells transfected with amyloid precursor protein C100. Neurosci Lett. 2002; 321: 61-64).

It has also been discovered that the Aβ load in mouse brain can be strongly decreased by the inhibition of GSK-3β (DaRocha-Souto, et al., Activation of glycogen synthase kinase-3 beta mediates β-amyloid induced neuritic damage in Alzheimer's disease. Neurobiol Dis. 2012; 45: 425-437).

Along with prior research suggesting involvement of GSK-3 in the pathogenesis of AD, there have also been recent studies indicating the intricate participation of the cannabinoid system in AD. It was reported that the cannabinoid system can limit the neurodegenerative processes that drive the progression of the disease, and may provide a new possibility for disease control (Jackson, et al., Cannabinoids and neuroprotection in CNS inflammatory disease. J Neurol Sci. 2005; 233: 21-25).

Currently, the complete pathway and mechanism of action of the cannabinoid system are not clear, however, studies have been performed to determine the involvement of the cannabinoid 1 (CB1) and cannabinoid 2 (CB2) receptors in AD brain (Campbell & Gowran, Alzheimer's disease; Taking the edge off with cannabinoids? Br J Pharmacol. 2007; 152: 655-662). The CB1 receptor is rich in the brain and contributes to learning, memory, and cognitive processes which are interrupted early in the onset of AD (Riedel & Davies, Cannabinoid function in learning, memory, and plasticity. Handb Exp Pharmacol. 2005; 445-477). While CB2 receptor expression is more limited and has been anatomically found in neurons within the brainstem (Van Sickle, et al., Identification and functional characterization of brainstem cannabinoid CB2 receptors. Science. 2005; 310: 329-332), cerebellum (Ashton, et al., Expression of the cannabinoid CB2 receptor in the rat cerebellum: An immunohistochemical study. Neurosci Lett. 2006; 396: 113-116), and microglia (Nunez, et al., Cannabinoid CB2 receptors are expressed by perivascular microglial cells in the human brain: An immunohistochemical study. Synapse. 2004; 53: 208-213).

Recent research has also examined the propensity of endocannabinoid receptor sub-types 1 (CB1) and 2 (CB2) to elicit a neuroprotective and anti-inflammatory effects on the brain when stimulated by endocannabinoids (Marchalant, et al., Cannabinoids attenuate the effects of aging upon neuroinflammation and neurogenesis. Neurobiol Dis. 2009; 34: 300-307). An increased expression of CB1 and CB2 receptors on microglia within the plaque, while CB1 expression is reduced in neurons more remote from the plaque in the postmortem brains of AD patients (Ramirez, et al., Prevention of Alzheimer's disease pathology by cannabinoids: Neuroprotection mediated by blockade of microglial activation. J Neurosci. 2005; 25: 1904-1913).

The endocannabinoid metabolizing enzyme, fatty acid amide hydrolase, is upregulated in the plaque in AD brains (Benito, et al., Cannabinoid CB2 receptors and fatty acid amide hydrolase are selectively overexpressed in neuritic plaque-associated glia in Alzheimer's disease brains. J Neurosci. 2003; 23: 11136-11141). There is also an increase in levels of anandamide metabolites, such as arachidonic acid, in the vicinity of the plaque (Benito, et al., Cannabinoid CB2 receptors and fatty acid amide hydrolase are selectively overexpressed in neuritic plaque-associated glia in Alzheimer's disease brains. J Neurosci. 2003; 23: 11136-11141). These findings may indirectly suggest that the increase in CB1 and CB2 receptors may be to counterbalance the lack of activity with their ligands due to increased metabolic activity of fatty acid amide hydrolase.

These changes in the cannabinoid system suggest an involvement of endogenous cannabinoids in the pathogenesis of AD or that this system may be altered by the pathophysiology of the disease (Campbell & Gowran, Alzheimer's disease; taking the edge off with cannabinoids? Br J Pharmacol. 2007; 152: 655-662). Understanding that microglial activation is unaffected in all cases of AD, it is important to identify that endogenous cannabinoids stop Aβ-induced microglial activation both in vitro and in vivo models (Martin-Moreno, et al., Cannabidiol and other cannabinoids reduce microglial activation in vitro and in vivo: Relevance to Alzheimer's disease. Mol Pharmacol. 2011; 79: 964-973). These receptors are known to experience time-dependent and brain region-specific changes during neurodegenerative and neuroinflammatory disorders to try to respond excitotoxicity and inflammation (Bisogno & Di Marzo, Cannabinoid receptors and endocannabinoids: Role in neuroinflammatory and neurodegenerative disorders. CNS Neurol Disord Drug Targets. 2010; 9: 564-573).

Background: Effect of THC on AD Biomarkers and Symptoms

Endocannabinoid receptors, CB1 and CB2, have been confirmed to interact with the endocannabinoid molecules: 2-arachidonoyl glycerol and anandamide. However, it has also been stated that CB1 and CB2 also react interact with Δ9-tetrahydrocannabinol (THC) an ingredient from the *Cannabis sativa* plant (Piomelli, The molecular logic of endocannabinoid signaling. Nat Rev Neurosci. 2003; 4: 873-884). Furthermore, early reports show that dronabinol, an oil-based solution of Δ9-THC, improves the disturbed behavior and stimulates appetite in AD patients (Volicer, et al., Effects of dronabinol on anorexia and disturbed behavior in patients with Alzheimer's disease. Int J Geriatr Psychiatry. 1997; 12: 913-919). THC possesses antioxidant, anti-inflammatory and neuroprotective properties (Jackson, et al., Cannabinoids and neuroprotection in CNS inflammatory disease. J Neurol Sci. 2005; 233: 21-25).

In the year 2006, Eubanks et al. demonstrated that THC competitively inhibits the enzyme acetylcholinesterase (AChE) as well as prevents AChE-induced amyloid β-peptide (Aβ) aggregation. The concentration of THC used was 50 micromolar at the cellular level (Eubanks, et al., A molecular link between the active component of marijuana and Alzheimer's disease pathology. Mol Pharm. 2006 November-December 3(6): 773-777).

Several studies have shown that *cannabis* ingestion, specifically THC, causes acute psychotic reactions, anxiety, impaired neuropsychological performance, impaired memory, executive functioning disorder, mitochondrial dysfunction, neuron apoptosis, and severe side effects such as feeling high, anxiety, depression, among others. (Morrison P D, Zois V, McKeown D A, Lee T D, Holt D W, Powell J F, Kapur S, Murray R M. Epub 2009 Apr. 1; The acute effects of synthetic intravenous Δ9-tetrahydrocannabinol on psychosis, mood, and cognitive functioning).

Background: Effect of Melatonin on AD Biomarkers and Symptoms

Melatonin (N-acetyl-5-methoxytryptamine), a tryptophan metabolite and synthesized mainly in the pineal gland and plays an important role in regulation of many physiological functions. This include regulating circadian rhythms, clearing free radicals, improving immunity, and generally inhibiting the oxidation of biomolecules. Studies have shown decreased levels of melatonin in serum and cerebrospinal fluid (CSF) of AD patients. (The human pineal gland and melatonin in aging and Alzheimer's disease. J. Pineal Res. 2005; 38: 145-152; Wu Y H., Feenstra M. G., Zhou J. N., Liu R. Y., Torano J. S., van Kan H. J., Fischer D. F., Ravid R., Swaab D. F. Molecular changes underlying reduced pineal melatonin levels in Alzheimer's disease: Alterations in pre-clinical and clinical stages. J. Clin. Endocr. Metab. 2003; 88: 5898-5906.).

Clinical studies have indicated that melatonin supplementation has been shown to improve circadian rhythmicity, for example, decreasing agitated behavior, confusion, and "sundowning" and to produce beneficial effects on memory in AD patients (Cohen-Mansfield J., Garfinkel D., Lipson S. Melatonin for treatment of sundowning in elderly persons with dementia—A preliminary study. Arch. Gerontol. Geriatr. 2000; 31: 65-76; Cardinali D. P., Brusco L. I., Perez Lloret S., Furio A. M. Melatonin in sleep disorders and jet-lag. Neuro Endocrinol. Lett. 2002; 23: 9-13.

Melatonin supplementation poses low toxicity and may be one of the possible strategies for symptomatic treatment. (Karasek M., Reiter R. J., Cardinali D. P., Pawlikowski M. Future of melatonin as a therapeutic agent. Neuro Endocrinol. Lett. 2002; 23: 118-121; Singer C., Tractenberg R. E., Kaye J., Schafer K., Gamst A., Grundman M., Thomas R., Thal L. J. Alzheimer's disease cooperative, SA multicenter, placebo-controlled trial of melatonin for sleep disturbance in Alzheimer's disease. Sleep. 2003; 26: 893-901.

Several studies have reported that ingestion of melatonin has side effects such as causes headache, dizziness, nausea, drowsiness depression, anxiety, tremor, cramps, irritability, confusion, hypotension, among others. (Nordlund J J, Lerner A B. The effects of oral melatonin on skin color and on the release of pituitary hormones. J Clin Endocrinol Metab. 1977; 45: 768-774; Papvasiliou P S, Cotzias G C, Duby S E, Steck A J, Bell M, Lawrence W H. Melatonin and parkinsonism. JAMA. 1972; 221: 88).

Background: Effect of Curcumin on AD Biomarkers and Symptoms

Curcumin is a polyphenolic natural compound derived from the root *Curcuma longa* or turmeric. Several studies have demonstrated that curcumin possesses properties of anti-carcinogenic, anti-inflammatory and anti-oxidative properties (Goel A, Kunnumakkara A B, Aggarwal B B. Curcumin as "Curecumin": from kitchen to clinic. Biochem Pharmacol. 2008 Feb. 15; 75(4): 787-809). Curcumin has been reported to bind to Aβ protein and prevent the aggregation of Aβ in vitro studies (Maiti P, Dunbar G L. Use of curcumin, a natural polyphenol for targeting molecular pathways in treating age-related neurodegenerative diseases. Int J Mol Sci. 2018 May 31; 19(6)). Several pre-clinical studies have reported that curcumin has possess an anti-amyloidogenic property by inhibiting formation of amyloid-β oligomers and fibrils, binds plaques in animal models of AD (Koronyo-Hamaoui M, Koronyo Y, Ljubimov A V, Miller C A, Ko M K, Black K L, Schwartz M, Farkas D L. Identification of amyloid plaques in retinas from Alzheimer's patients and noninvasive in vivo optical imaging of retinal plaques in a mouse model. Neuroimage. 2011 January; 54 (Suppl 1): S204-S217; Maiti P, Hall T C, Paladugu L, Kolli N, Learman C, Rossignol J, Dunbar G L. A comparative study of dietary curcumin, nanocurcumin, and other classical amyloid-binding dyes for labeling and imaging of amyloid plaques in brain tissue of 5x-familial Alzheimer's disease mice. Histochem Cell Biol. 2016 November; 146(5): 609-625; Maiti P, Paladugu L, Dunbar G L. Solid lipid curcumin particles provide greater anti-amyloid, anti-inflammatory and neuroprotective effects than curcumin in the 5xFAD mouse model of Alzheimer's disease. BMC Neurosci. 2018 Feb. 23; 19(1): 7). Curcumin has been shown to bind to neurofibrillary tangles in AD brain tissue (Mohorko N, Repovs G, Popovic M, Kovacs G G, Bresjanac M. Curcumin labeling of neuronal fibrillar tau inclusions in human brain samples. J Neuropathol Exp Neurol. 2010 April; 69(4): 405-414; Mutsuga M, Chambers J K, Uchida K, Tei M, Makibuchi T, Mizorogi T, Takashima A, Nakayama H. Binding of curcumin to senile plaques and cerebral amyloid angiopathy in the aged brain of various animals and to neurofibrillary tangles in Alzheimer's brain. J Vet Med Sci. 2012 January; 74(1): 51-57)

Studies have reported that curcumin can decrease the level of Aβ-induced increases in reactive oxygen species, curcumin can also enhance decreases in mitochondrial membrane potential, and activates or inhibits caspase, a protein that is intimately involved in the regulation of apoptosis activation, as well as defend human neurons from oligomeric Aβ induced toxicity (Mishra, et al., 2011) It is also reported that cannabinoids are active against inflammation (Mishra S, Mishra M, Seth P, Sharma S K. Tetrahydrocurcumin confers protection against amyloid (3-induced toxicity. Neuroreport. 2011 Jan. 5; 22(1): 23-27).

A small double-blind, placebo-controlled 18-month trial reported that daily oral theracurmin (90 mg) treatment led to improved memory and attention, and a reduction in brain amyloid and tau levels in non-demented adults (Small, et al., Memory and brain amyloid and tau effects of a bioavailable form of curcumin in non-demented adults: A double-blind, placebo-controlled 18-month trial, Am J Geriatr Psychiatry. 2018 March; 26(3): 266-277).

It is well established that AD is complex chronic disease arising from alterations in various signaling pathways. Several hypotheses have been put forward and investigated in AD pathology including β amyloid pathology, inflammation, neurodegeneration, and oxidative stress, hyperphosphorylation of tau, mitochondrial cascade, prion, and so on. Targeting one hypothesis has failed to provide protection against AD. Several studies have demonstrated that monotherapy has limited efficacy as compared to polytherapy. Polytherapy involves two or more active ingredients which target key signaling pathways.

Several studies have reported that ingestion of curcumin has side effects such as rash, yellow stool, among others. (Lao C. D., Ruffin M. T., Normolle D., Heath D. D., Murray S. I., Bailey J. M., Boggs M. E., Crowell J., Rock C. L., Brenner D. E. Dose escalation of a curcuminoid formulation. BMC Complement. Altern. Med. 2006; 6: 10 doi: 10.1186/1472-6882-6-10).

SUMMARY

The invention provides methods and compositions for treating central nervous system (CNS) disorders in humans and animals which involves treating a patient with a CNS disorder such as Alzheimer's disease or Parkinson's disease with a composition including (i) tetrahydrocannabinol (THC) in a dose amount per 70 kg patient of from about 14

µg to about 10.0 mg, preferably in an ultra-low dose per 70 kg patient of from about 14 µg to about 2.0 mg; (ii) melatonin in a dose amount per 70 kg patient of from about 1.4 mg to about 20.0 mg; and (iii) curcumin in a dose amount per 70 kg patient of about 0.35 mg to about 500 mg.

In a preferred embodiment, cannabidiol (CBD) in a dose amount per 70 kg patient of from about 14 µg to about 200 mg is administered to a patient along with THC, melatonin and curcumin in the dose amounts specified herein or with THC and melatonin without curcumin. These formulations are preferred for treating Parkinson's disease. In a further embodiment, a composition for treating central nervous system (CNS) disorders in humans and animals includes: (i) tetrahydrocannabinol (THC) in an ultra-low dose amount per 70 kg patient of from about 14 µg to about 2.0 mg; and (ii) cannabidiol (CBD) in a dose amount per 70 kg patient of from about 14⁻g mg to about 200 mg. Another composition for treating central nervous system (CNS) disorders in humans and animals includes: (i) cannabidiol (CBD) in a dose amount per 70 kg patient of from about 14⁻g mg to about 200 mg; and (ii) melatonin in a dose amount per 70 kg patient of from about 1.4 mg to about 20.0 mg. Additional compositions comprise THC or CBD each with curcumin in the dose amounts disclosed herein without melatonin. The compositions and methods for treating central nervous system (CNS) disorders and diseases such as amyloidosis, protein folding diseases, tauopathy, and specifically for example Alzheimer's Disease and Parkinson's Disease among others, in humans and in veterinary animals are effective to reduce Aβ expression; reduce Aβ aggregation; maintain APP expression; enhance mitochondrial functioning; decrease phosphorylation of GSK3β protein; decrease the expression of GSK3β protein; decrease phosphorylation of tau protein; reduce anxiety; reduce agitation; reduce sleep disorder, and/or reduce caregiver distress, without severe side effects associated with high doses of THC, CBD melatonin and/or high doses of curcumin.

In another preferred embodiment, the compositions of the invention are administered orally in a liquid carrier which includes a non-ionic emulsifier in an amount sufficient to maintain stability and solubility of the formulation. Suitable non-ionic emulsifiers include lecithin from soy or sunflower, polysorbate 80, and vitamin E TPGS (d-α-tocopheryl polyethylene glycol 1000 succinate). Natural anti-fungal agents such as rutin are also preferred to maintain stability.

DESCRIPTION

The invention provides a method and compositions for treating central nervous system (CNS) disorders in humans and animals which involves treating a patient with a CNS disorder such as Alzheimer's or Parkinson's with a composition including (i) tetrahydrocannabinol (THC) in an ultra-low dose amount per 70 kg patient of from about 14 µg to about 2.0 mg without severe psychological impairments and side effects associated with higher doses of THC; (ii) melatonin in a dose amount per 70 kg patient of from about 14 µg to about 77.0 mg; and (iii) curcumin in a dose amount per 70 kg patient of about 7 mg to about 100 mg.

In a preferred embodiment, cannabidiol (CBD) in a dose amount per 70 kg patient of from about 14 µg to about 100 mg is administered to a patient along with THC, melatonin, and curcumin.

In another preferred embodiment, the composition of the invention is administered orally in a liquid carrier which includes a non-ionic emulsifier in an amount sufficient to maintain stability and solubility of the composition components. Suitable non-ionic emulsifiers include lecithin from soy or sunflower, Tween 80 (polysorbate 80), and vitamin E TPGS (d-α-tocopheryl polyethylene glycol 1000 succinate).

This invention provides a method for treating certain CNS disorders and symptoms, and diseases classified broadly as amyloidosis, protein folding diseases, tauopathy, and specifically for example Alzheimer's Disease (AD), among others, in humans and veterinary animals which includes administering to a subject in need thereof a composition including (i) an effective amount of melatonin, (ii) an effective amount of curcumin, and (iii) a *cannabis* compound containing THC in a micro dosage amount that is sufficient to provide efficacy while not inducing side effects commonly associated with *cannabis*, melatonin or curcumin.

Compositions of the invention for treating Alzheimer's and related CNS diseases in humans and veterinary animals include: (i) an effective amount of melatonin, (ii) an effective amount of curcumin, and (iii) a *cannabis* compound containing THC in an amount that is sufficient to provide efficacy while not inducing side effects commonly associated with *cannabis*, melatonin or curcumin. The composition is administered orally in a suitable carrier.

Compositions of the invention for treating Alzheimer's and related CNS diseases in humans and veterinary animals include: (i) an effective amount of melatonin, (ii) an effective amount of curcumin, (iii) a *cannabis* compound containing THC, and (iv) a *cannabis* compound containing CBD, in an amount that is sufficient to provide efficacy while not inducing side effects commonly associated with *cannabis*, melatonin or curcumin. The composition is administered orally in a suitable carrier.

Compositions of the invention for treating Alzheimer's and related CNS diseases in humans and veterinary animals include: (i) an effective amount of melatonin, (ii) an effective amount of curcumin, and (iii) a *cannabis* compound containing CBD, in an amount that is sufficient to provide efficacy while not inducing side effects commonly associated with *cannabis*, melatonin or curcumin. The composition is administered orally in a suitable carrier.

Compositions of the invention for treating Alzheimer's and related CNS diseases in humans and veterinary animals include: (i) an effective amount of melatonin and (ii) an effective amount of curcumin in an amount that is sufficient to provide efficacy while not inducing side effects commonly associated with higher doses of melatonin and curcumin. The composition is administered orally in a suitable carrier.

*Cannabis* compounds can be synthetic (chemically synthesized) or extracted from *cannabis* plants such as *sativa*, indica, hemp, or hybrid strains of *sativa* and indica. A preferred source of tetrahydrocannabinol (THC) is so-called organic THC, which is extracted from *cannabis* and contains minor amounts of other cannabinoids such as CBD. Full-spectrum *cannabis* oil, full-spectrum hemp oil, and full-spectrum marijuana are extracted from hemp This invention provides a method for treating certain disorders, symptoms, and diseases classified broadly as amyloidosis, protein folding diseases, tauopathy, and specifically, for example, Alzheimer's Disease (AD), among others, in mammals by administering to a subject in need thereof a composition including: (i) an effective amount of melatonin, (ii) an effective amount of curcumin, and (iii) a *cannabis* compound in an amount that is sufficient to provide efficacy while not inducing side effects commonly associated with *cannabis*.

A preferred 1 ml oral suspension for a 70-kg human is administered once a day, twice a day, thrice a day or four times a day depending on the severity of the symptoms and comprises up to 2.5 mg of THC, up to 1.5 mg of melatonin, and up to 0.5 mg curcumin.

A preferred 1 ml oral suspension for a 70-kg human is administered once a day, twice a day, thrice a day or four times a day depending on the severity of the symptoms and comprises up to 2.5 mg of THC, up to 1.5 mg of melatonin, and up to 200 mg CBD.

Dose ranges for the components of the inventive composition follow.

THC is administered with the other inventive components in dose amounts as follows:
Per kg of patient weight: from about 0.2 µg to about 0.14 mg
Per 70 kg patient: from about 14 µg to about 10 mg
Preferred per kg of patient weight: from about 0.2 µg to about 0.03 mg.
Preferred per 70 kg patient: from about 14 µg to about 2.0 mg.

Melatonin is administered with the other inventive components in dose amounts as follows:
Per kg of patient weight: from about 0.02 mg to about 0.3 mg.
Per 70 kg patient: from about 1.4 mg to about 20 mg.
Preferred per kg of patient weight: from about 0.01 mg to about 0.15 mg.
Preferred per 70 kg patient: from about 0.7 mg to about 10 mg.

CBD is administered with the other inventive components in dose amounts as follows:
Per kg of patient weight: from about 0.2 µg to about 3.0 mg.
Per 70 kg patient: from about 14 µg to about 200 mg.
Preferred per kg of patient weight: from about 0.03 mg to about 3.0 mg.
Preferred per 70 kg patient: from about 2.0 mg to about 200 mg.
Also preferred per kg of patient weight: from about 0.02 µg to about 0.036 mg.
Also preferred per 70 kg patient: from about 14 µg to about 2.5 mg.

Curcumin is administered with the other inventive components in dose amounts as follows:
Per kg of patient weight: from about 0.005 mg to about 7.0 mg.
Per 70 kg patient: from about 0.35 mg to about 500 mg.
Preferred per kg of patient weight: from about 0.01 mg to about 3.5 mg.
Preferred per 70 kg patient: from about 0.7 mg to about 250 mg.

The preferred oral dose is in the range of 1 ml of an oral suspension, for a 70-Kg human, once a day, twice a day, thrice a day, or four times a day depending on the severity of the symptoms comprising of a *cannabis* compound with up to 2.5 mg of THC, but less than the amount which causes psychological impairments and side effects associated with higher doses of THC, up to 1.5 mg of melatonin, and up to 0.5 mg curcumin.

A preferred 1 ml oral suspension, for a 70-Kg human, once a day, twice a day, thrice a day, or four times a day depending on the severity of the symptoms comprises THC in the range from about 14 µg to about 10 mg, melatonin in the range from about 0.02 mg to about 0.3 mg, curcumin in the range from about 0.35 mg to about 500 mg, and CBD in the range from about 14 µg to about 200 mg, but with THC, less than the amount which causes psychological impairments and side effects associated with higher doses of THC, melatonin, curcumin, and CBD.

The preferred oral dose is in the range of 1 ml of an oral suspension, for a 70-Kg human, once a day, twice a day, thrice a day, or four times a day depending on the severity of the symptoms comprising of THC in the range shown in Table 1, CBD in the range shown in Table 1 but with THC, less than the amount which causes psychological impairments and side effects associated with higher doses of THC, and CBD.

The combination of melatonin, curcumin, and *cannabis* is believed to work along several pathways in controlling various endpoints and the hallmarks of Alzheimer's Disease as well as diseases classified broadly as amyloidosis, protein folding diseases, and/or tauopathy. It is believed that the dosing in the formulation does not cause any of the side effects commonly associated with *cannabis*, melatonin, or turmeric. The dosing of *cannabis* prescribed in the formulation herein is below the 5 mg levels prescribed by the FDA for dronabinol and well below the 50 micromolar level used in the Eubanks 2006 study (Eubanks L m, Rogers C J, Beuscher A E $4^{th}$, Koob G F, Olson A J, Dickerson T J, Janda K D. A molecular link between the active component of marijuana and Alzheimer's disease pathology. Mol Pharm. 2006 November-December 3(6): 773-777). Using time-release formulations for any of the components, can further enhance bioavailability.

The combination of lower dose of melatonin, curcumin, and *cannabis* compounds unexpectedly leads to (i) a reduction of side effects, such as transient, acute psychotic reactions, anxiety, impaired neuropsychological performance, memory impairments, executive functioning disorder, mitochondrial dysfunction, and (ii) other side effects like headache, dizziness, nausea, drowsiness, depression, anxiety, tremor, cramps, irritability, confusion, hypotension, rash, yellow stool, among others, otherwise present with higher doses of melatonin, curcumin, and *cannabis* compounds, or when each of melatonin, curcumin, and or *cannabis* is used alone.

Suitable pharmaceutically acceptable *cannabis* compounds include *cannabis* extract, which includes phytocannabinoids such as tetrahydrocannabinol "THC" (9-Tetrahydrocannabinol ($\Delta$9-THC), 8-tetrahydrocannabinol ($\Delta$8-THC) and 9-THC Acid), cannabidiol (CBD), other phytocannabinoids such as cannabinol (CBN), cannabichromene (CBC), cannabigerol (CBG) among others, terpenoids and flavonoids. Standardized *cannabis* extract (SCE) consists of mostly THC, CBD, and CBN. Organic THC consists of solvent-extracted THC from *cannabis* with lesser or trace amounts of other cannabinoids and terpenoids. Synthetic or pure THC is free of CBD and other compounds is a preferred *cannabis* compound.

THC and CBD can be extracted from a *Cannabis* indica dominant strain using, for example, high pressure and carbon dioxide or ethanol as a solvent in a 1500-20 L subcritical/supercritical CO2 system made by Apeks Super Critical Systems, 14381 Blamer Rd., Johnstown, Ohio, 43031.

The *cannabis* plant in its natural form contains THCA. The resin called shatter is extracted from the *cannabis* flower using any of a variety of methods including CO2 extraction as described herein. Shatter is produced using a three-step process: kief separation, extraction, and winterization. *Cannabis* flower is introduced into a steel tumbler over a mesh sieve with dry ice. Flower is frozen and broken while tumbled with dry ice chunks allowing fine THCA-bearing particles (kief) to fall through the sieve. THCA is then extracted from kief using supercritical extraction. A solvent such as CO2 and kief are introduced into a chamber. That sealed chamber is pressurized to approximately 2800 psi and heated to 53° C. Supercritical CO2 is then allowed to flow out of the pressurized chamber into a vile at room temperature and pressure (while more CO2 is introduced to maintain pressure in the chamber). As the CO2 vaporizes in the collector vial, it deposits shatter. In the third, optional step, called winterization, the CO2 oil is dissolved in ethanol (¾ ounce shatter dissolved in 400 ml ethanol). This mixture is then poured through a filter (such as a coffee filter) frozen for 48 hours, then warmed, filtered again, and then spun with heat to evaporate off the ethanol. The remaining resin contains a combination of THCA, THC, and other *cannabis* compounds. The resin is heated for 60 minutes at 240° F. An HPLC test is run to determine the amount of THC and THCA present in the resin. 45 mg of the resin containing 99% THC (as determined by HPLC) is dissolved in 1 ml of ethyl alcohol. The dissolved resin is transferred and mixed with the solution of curcumin-honey-ascorbic acid-melatonin solution. The solution is filtered and sterilized using a 0.2-micron PES Nalgene filtration unit under constant pressure in a sterilized environment. The filtered 30 ml solution is transferred to and stored in an amber glass bottle that is autoclaved in an aseptic condition.

Animals, especially dogs and cats, can be treated according to the invention. Dosage amounts and serum levels of drug are the same as disclosed above for human patients.

The term "about" as used herein is intended to allow for variations in formulations of plus or minus 1 μg or 1 mg.

The transitional term "comprising" is synonymous with "including," "containing," or "characterized by," is inclusive or open-ended, and does not exclude additional, unrecited elements or method steps. The transitional phrase "consisting essentially of" is intended to embrace only specified components or ingredients or steps, and those that do not materially affect the basic and novel characteristics of the claimed invention. In other words, elements or ingredients which materially affect the essence of the invention are excluded by the phrase consisting essentially of.

Example 1: General Method of Preparation

The following example sets out a method for preparing the formulation. One dose of the liquid formulation is measured at 1 ml, comprising of 70% of water, 20% honey, and 10% ethyl alcohol, 1.5 mg THC, 1.5 mg melatonin, 1 mg turmeric, 1 mg ascorbic acid as an anti-oxidative agent, and 0.1% sodium benzoate as an anti-fungal agent. Food-grade solvents and carriers include, among others, DMSO and polyethylene glycol. Food-grade, anti-oxidative agents include, among others, carotenoids and tocopherols. Food-grade agents with anti-fungal properties include flavonoids among others.

The following is a list of ingredients for making 30 ml of the formulation:

Melatonin procured from Bulk Inc: 45 mg.
Curcumin procured from Bulk Inc: 30 m.
Ascorbic acid: 30 mg
Ethyl alcohol 200 proof: 3 ml.
Water (USP grade RMBI): 21 ml
Honey (Kirkland—Costco): 6 ml
THC procured as "shatter": 45 mg
Sodium benzoate USP, 33 mg Weigh 30 mg of curcumin in a digital weighing machine and place it in a glass beaker containing 1 ml ethyl alcohol (200 proof). Add 21 ml of water to the curcumin alcohol mixture. Boil the water and curcumin mixture for 10 minutes on the hot plate, and stir the mixture using a magnetic stirrer. After the mixture cools to room temperature, add 6 ml of honey to the curcumin mixture slowly with stirring. Weigh 30 mg of ascorbic acid and add to the curcumin-honey mixture. Weigh 45 mg of melatonin and dissolve it in 1 ml of ethyl alcohol. Once melatonin is completely dissolved in alcohol, transfer the melatonin mixture to curcumin-honey-ascorbic solution.

A further embodiments of Example 1 comprises of replacing turmeric with any of, or a combination of curcumin, nano-curcumin, and turmeric.

Example 2

An Alzheimer's patient exhibiting slight anxiety and/or agitation is given 1 ml of the formulation set out in Example 1, in the morning on an empty stomach, prior to breakfast, and 1 ml prior to dinner in the evening. The patient exhibits reduced anxiety and agitation.

Example 3

An advanced-stage Alzheimer's patient exhibiting moderate to severe anxiety, sleep disorder, and/or agitation is given 1 ml of the formulation three to four times a day, morning afternoon and evening, prior to meals. The patient exhibits reduced anxiety and agitation vastly improving the distress caused to the caregivers.

Example 4

The formulation in Example 1, is supplemented with 50 mg of Cannabidiol (CBD) dissolved in 1 ml of ethyl alcohol and added to the overall solution of Example 1. A moderate-stage Parkinson's patient exhibiting levodopa-induced dyskinesia, stammering, anxiety, gait, sleep disorder, and/or agitation is given 1 ml of the formulation of Example 4, three to four times a day, morning afternoon and evening, prior to meals. The patient exhibits reduced symptoms.

Example 5

The formulation of Example 4, without the THC component, is administered three times a day prior to meals to a moderate-stage Parkinson's patient exhibiting levodopa-induced dyskinesia, stammering, anxiety, gait, sleep disorder, and/or agitation. The patient exhibits reduced symptoms.

Example 6

The formulation and dosing in Example 4, is administered to a patient with moderate incontinence, two times a day, morning and evening, prior to meals. The patient exhibits reduced symptoms.

Example 7

The formulation and dosing in Example 1, is administered, once a day, twice a day, to an individual exhibiting early signs of Alzheimer's disease, including plaques and tangles, as determined by a PET scan, as a prophylactic. The patient exhibits a slowdown in the buildup of plaques and tangles.

Example 8

The formulation and dosing in Example 1, without the THC component is administered to a patient with mild symptoms of Alzheimer's disease two times a day, morning and evening, prior to meals as a prophylactic. The patient exhibits reduced symptoms.

Example 9

To address the solubility and stability of THC in an alcohol/water mixture, the following active ingredients were combined in 30 ml solution:
Turmeric: 30 mg
Melatonin: 45 mg
THC: 45 mg
Honey: 6 ml
Water: 21 ml
Ascorbic acid (THC antioxidant): 30 mg
Rutin (antifungal agent): 33 mg
Ethyl alcohol: 3 ml
Polysorbate-80

A non-ionic emulsifier is preferably added to increase the solubility of THC and other active ingredients in the solution. Nonionic emulsifiers include lecithin from soy and sunflower, polysorbate 80, and vitamin E TPGS (d-α-tocopheryl polyethylene glycol 1000 succinate). Polysorbate 80 is a nonionic surfactant and emulsifier derived from polyethoxylated sorbitan and oleic acid.

Preferred emulsifiers are from 1-3% polysorbate-80, 2-5% vitamin E TPGS and a combination of 1% polysorbate-80 and 1-2.5% Vitamin E TPGS.

Sodium benzoate in Example 1 serves as an antifungal agent and natural antifungal agents such as rutin are also suitable. Natural antifungal agents with broad-spectrum antifungal properties are more potent and less toxic compared to sodium benzoate.

Rutin, also called rutoside, quercetin-3-O-rutinoside, and sophorin, is a glycoside combining the flavonol quercetin and the disaccharide rutinose. It is a citrus flavonoid found in a wide variety of plants including citrus fruit.

Example 10

A preferred formulation in a 30 ml solution which maintains THC and the other components in a stable solution is as follows:
Curcumin: 0.05%
Melatonin: 0.15%
THC: 0.25%
Honey: 20%
Water: 65 to 55%
Ascorbic acid: 1%
Rutin: 0.05%
Ethyl alcohol: 12%
Polysorbate-80 (1%) and Vitamin E-TPGS (1 to 2.5%).
CBD: 0.25% to 5%

It is preferred to use 20-30% honey and/or 12% alcohol to increase the solubility of THC. The use of 1% of an antioxidant such as ascorbic acid is also preferred to counter degradation of THC when exposed to atmospheric oxygen.

While this invention has been described as having preferred sequences, ranges, ratios, steps, order of steps, materials, structures, symbols, indica, *sativa*, hemp, graphics, color scheme(s), shapes, configurations, features, components, or designs, it is understood that it is capable of further modifications, uses and/or adaptations of the invention following in general the principle of the invention, and including such departures from the present disclosure as those come within the known or customary practice in the art to which the invention pertains, and as may be applied to the central features hereinbefore set forth, and fall within the scope of the invention and of the limits of the claims appended hereto or presented later. The invention, therefore, is not limited to the preferred embodiment(s) shown/described herein

The invention claimed is:

1. Composition for treating symptoms of Alzheimer's disease; the composition comprising:
    (i) tetrahydrocannabinol (THC) in a dose amount per 70 kg patient from 1.0 mg to 3.0 mg,
    (ii) melatonin in a dose amount per 70 kg patient from about 14 µg to about 77.0 mg, and
    (iii) curcumin in a dose amount per 70 kg patient from about 0.35 mg up to 0.5 mg.

2. Composition of claim 1 which is a 1 mL oral suspension.

3. Composition of claim 1 wherein the dose amount of the THC is 1.0 mg up to 2.5 mg and the dose amount of the melatonin is 14 µg up to 1.5 mg.

4. Composition of claim 3 which is a 1 mL oral suspension.

5. Composition of claim 1 wherein the THC is selected from the group consisting of dronabinol, Δ9-THC, Δ8-THC, and THC Acid (THCA).

6. Composition of claim 1 wherein the curcumin is selected from the group consisting of turmeric, and mixtures thereof.

7. Composition of claim 1 in a liquid carrier further comprising a non-ionic emulsifier in an amount sufficient to maintain stability and solubility of the composition.

8. Composition of claim 7, wherein the non-ionic emulsifier is selected from the group consisting of soy lecithin, sunflower lecithin, polysorbate 80, and D-α-tocopheryl polyethylene glycol 1000 succinate (Vitamin E TPGS).

9. Composition of claim 1 further comprising an anti-fungal agent.

10. Composition of claim 9, wherein the anti-fungal agent is a natural anti-fungal agent.

11. Composition for treating a human suffering from Alzheimer's disease; the composition comprising dose amounts per 70 kg-person weight as follows:
    (i) tetrahydrocannabinol (THC) from about 2.0 mg up to 2.5 mg,
    (ii) melatonin from about 0.7 mg to about 10.0 mg, and
    (iii) curcumin up to 0.5 mg.

12. Composition of claim 11 further comprising polysorbate 80, D-α-tocopheryl polyethylene glycol 1000 succinate (Vitamin E TPGS), ethanol, and water.

13. Composition of claim 11 which is a 1 mL oral suspension.

* * * * *